United States Patent
Byrnes

(10) Patent No.: US 10,835,022 B2
(45) Date of Patent: *Nov. 17, 2020

(54) EYEGLASS HOLDER

(71) Applicant: IDEAPHILE LLC, Chicago, IL (US)

(72) Inventor: Patrick J. Byrnes, Chicago, IL (US)

(73) Assignee: IDEAPHILE LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,534

(22) Filed: Dec. 19, 2019

(65) Prior Publication Data
US 2020/0121066 A1 Apr. 23, 2020

Related U.S. Application Data

(63) Continuation of application No. 14/829,123, filed on Aug. 18, 2015, now Pat. No. 10,537,166.

(60) Provisional application No. 62/063,072, filed on Oct. 13, 2014.

(51) Int. Cl.
*A45F 5/00* (2006.01)
*G02C 3/00* (2006.01)
*G02C 3/04* (2006.01)

(52) U.S. Cl.
CPC ............... *A45F 5/00* (2013.01); *G02C 3/00* (2013.01); *G02C 3/04* (2013.01); *A45F 2005/006* (2013.01); *A45F 2200/0541* (2013.01)

(58) Field of Classification Search
CPC ............ A45F 5/00; A45F 2005/006; A45F 2200/0541; A45C 11/04; A47G 29/08; A47F 7/021; G02C 3/00; G02C 3/04; Y10T 24/1371; Y10T 24/1388; Y10T 24/1365; Y10S 248/902; B60R 7/082

USPC ........................................................ 224/604
See application file for complete search history.

(56) References Cited

U.S. PATENT DOCUMENTS

| 177,415 | A | * | 5/1876 | Miser | ............. A45C 11/04 |
| | | | | | 206/5 |
| 1,177,415 | A | | 5/1876 | Miser | |
| 2,481,946 | A | | 9/1949 | Pendleton | |
| 2,539,922 | A | | 1/1951 | Nyberg | |
| 2,818,621 | A | | 1/1958 | Pretz | |
| D185,852 | S | | 8/1959 | McFadyen | |

(Continued)

FOREIGN PATENT DOCUMENTS

| DE | 2728906 A1 | 1/1979 |
| FR | 2615832 A1 | 12/1988 |
| WO | 2007088124 A1 | 8/2007 |

*Primary Examiner* — Nathan J Newhouse
*Assistant Examiner* — Matthew T. Theis
(74) *Attorney, Agent, or Firm* — Neal, Gerber & Eisenberg LLP

(57) ABSTRACT

A wearable eyeglass holder that holds a temple of a folded pair of eyeglasses in a manner that resists the inadvertent unfolding of the held temple and the wearer's loss of the eyeglasses. The eyeglass holder has a connector that enables it to be attached, in a pendulous manner, to the wearer's neck, clothing, or other object. The eyeglass holder has an oblong body with a double convex shape and a longitudinal inner channel with two oblong openings on the same face of the body. A temple of a pair of eyeglasses, inserted through the upper opening, comes to rest upon a waist extending between the openings. The eyeglasses rest on the waist and a foot of the body provides a second contact point with the temple that maintains it in a closed position.

16 Claims, 35 Drawing Sheets

(56) References Cited

U.S. PATENT DOCUMENTS

| | | |
|---|---|---|
| 3,956,795 A | 5/1976 | Kosakai |
| 4,157,166 A | 6/1979 | Voelker |
| 4,239,167 A | 12/1980 | Lane |
| 4,452,354 A | 6/1984 | Tabachnick |
| 4,771,515 A | 9/1988 | Guarro |
| 4,894,887 A | 1/1990 | Ward |
| 5,033,612 A | 7/1991 | Bivins |
| 5,046,696 A | 9/1991 | Lee |
| 5,305,934 A | 4/1994 | Grey |
| 5,319,838 A | 6/1994 | Eppenauer |
| D348,475 S | 7/1994 | Kahari |
| 5,343,599 A | 9/1994 | Reeves |
| 5,408,728 A | 4/1995 | Wisniewski |
| 5,414,906 A | 5/1995 | Kren |
| 5,619,774 A | 4/1997 | Perry |
| 5,626,224 A | 5/1997 | Clark et al. |
| 5,699,140 A | 12/1997 | Fuhrman |
| 5,860,191 A | 1/1999 | Sieger |
| 5,893,198 A | 4/1999 | Decotis |
| 5,956,812 A | 9/1999 | Moennig |
| 6,039,173 A | 3/2000 | Crow |
| 6,076,925 A | 6/2000 | Kraut |
| D436,008 S * | 1/2001 | Klein .......................... D27/161 |
| 6,206,258 B1 | 3/2001 | Calder |
| 6,260,749 B1 | 7/2001 | Horovitz |
| 6,263,546 B1 | 7/2001 | Baldwin et al. |
| D471,357 S | 3/2003 | Hoppe et al. |
| 6,533,414 B2 | 3/2003 | Newler |
| 6,539,587 B2 | 4/2003 | Harrison |
| 6,688,507 B2 | 2/2004 | McCormack |
| 7,325,921 B1 | 2/2008 | Moorer |
| 7,584,527 B2 | 9/2009 | Jones |
| D605,398 S | 12/2009 | Rodriguez |
| D649,348 S | 11/2011 | Murphy |
| 8,739,570 B2 | 6/2014 | Prestwidge |
| 2005/0241115 A1 | 11/2005 | Zoullas |
| 2009/0126159 A1 | 5/2009 | Murphy |
| 2009/0284709 A1 | 11/2009 | Didner |
| 2012/0118923 A1 | 5/2012 | Allen |
| 2013/0057823 A1 | 3/2013 | Cluff |

* cited by examiner

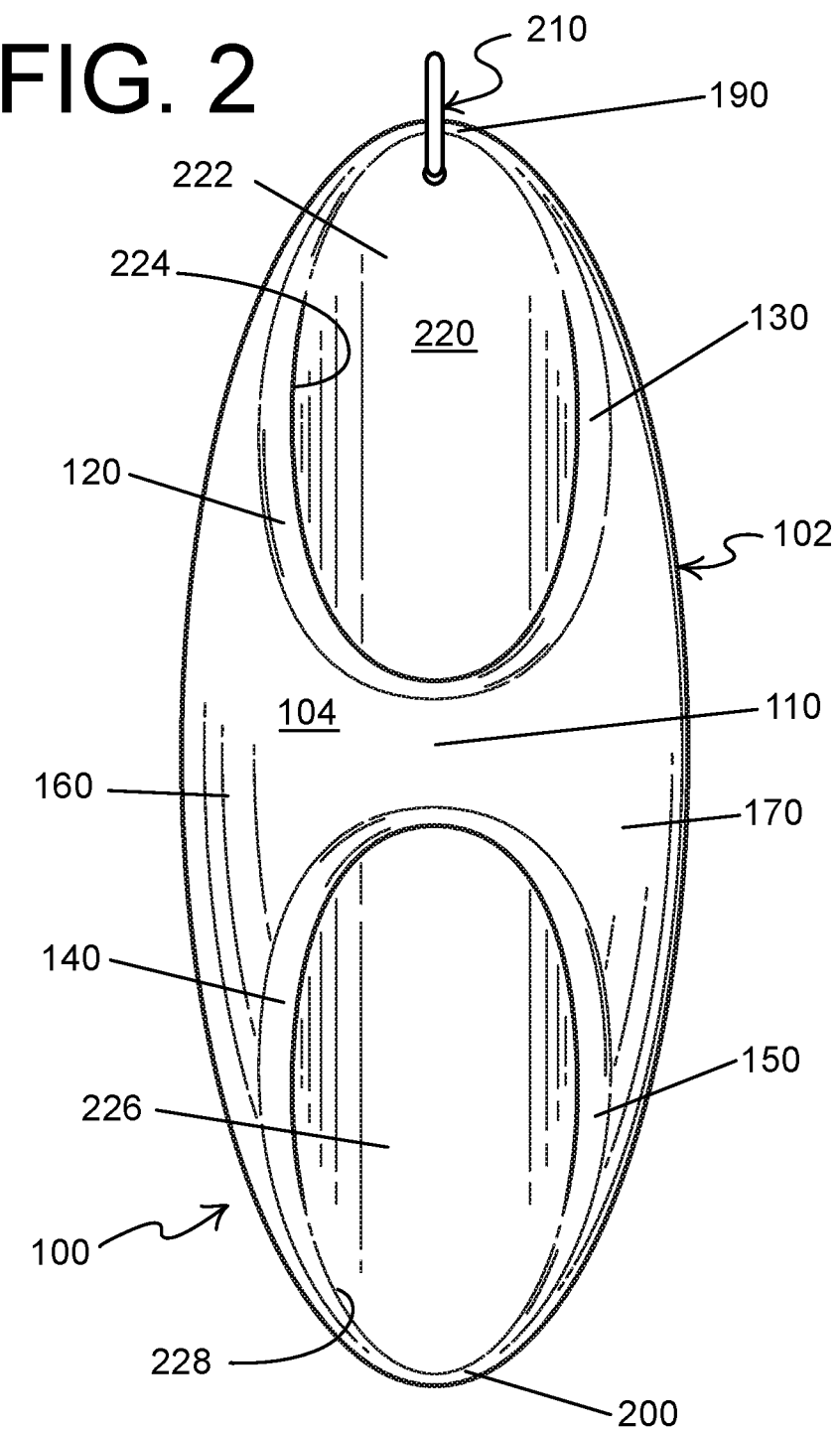

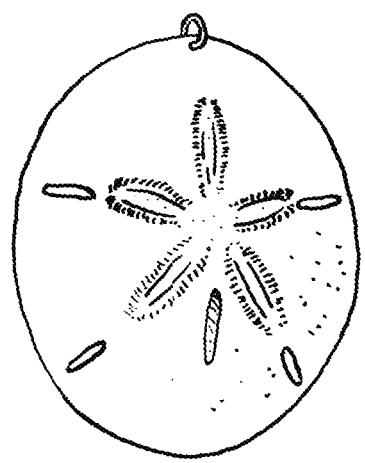
FIG. 10  FIG. 11
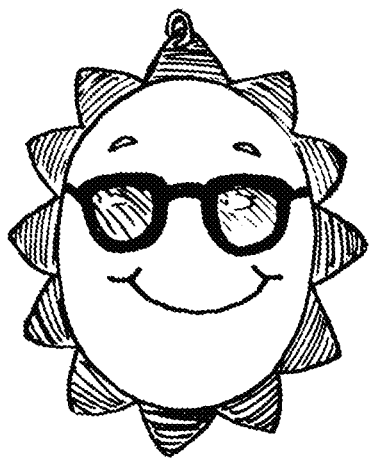
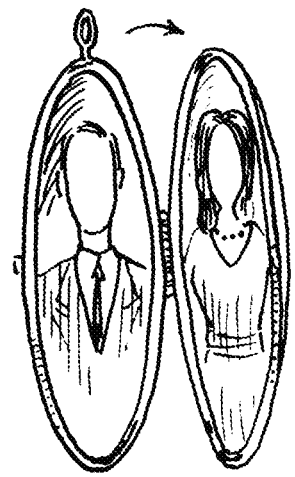
FIG. 12  FIG. 13

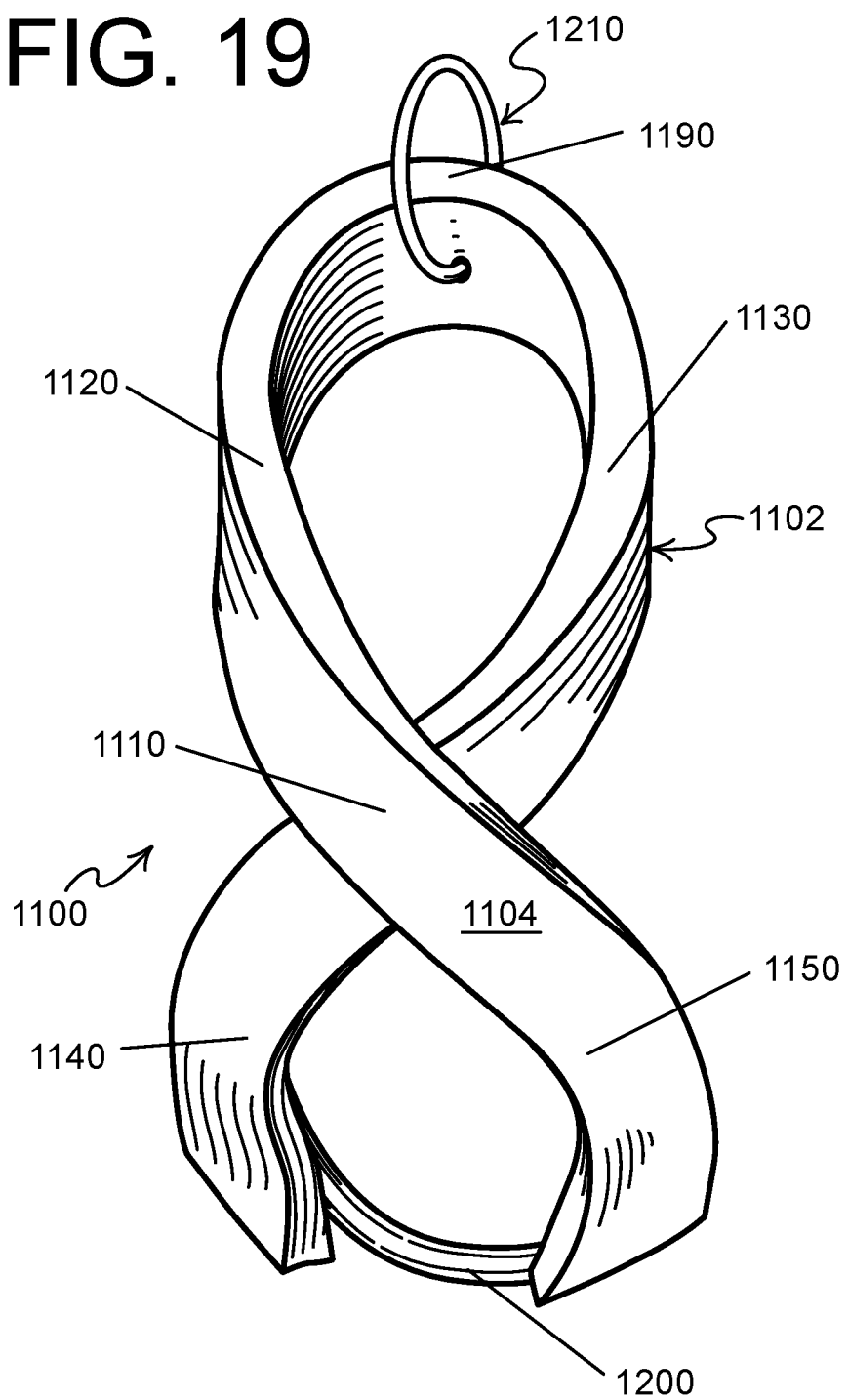

EYEGLASS HOLDER

PRIORITY CLAIM

This patent application is a continuation of, claims priority to and the benefit of U.S. patent application Ser. No. 14/829,123, filed on Aug. 18, 2015, which claims priority to and the benefit of U.S. Provisional Patent Application No. 62/063,072, filed Oct. 13, 2014, the entire contents of both of which are incorporated herein by reference.

BACKGROUND

Numerous different types of eyeglasses are worn by people in the United States and throughout the rest of the world. For example, different types of eyeglasses include standard or conventional eyeglasses (meant to be worn all day long) and special purpose eyeglasses such as reading glasses and sunglasses (meant to be worn for specific tasks or purposes or for certain practical needs). Eyeglasses are made in many different styles and with many different aesthetic appearances, and are often part of a person's fashion.

Eyeglasses typically include a frame and two lenses attached to the frame. The frame typically includes a front section having two rims that hold the lenses and a bridge extending between the rims. The bridge sits over the nose and supports part of the weight of the eyeglasses. The frame also typically includes nose pads attached to the interior sections of the rims. The nose pads increase comfort and help the eyeglasses stay positioned on the wearer's face. The frame also typically includes two end pieces extending from the rims and two temples respectively hinged to the end pieces. The temples respectively include curved sections that are configured to extend over and behind the ears of the wearer to also support and hold the eyeglasses on the wearer.

People who wear eyeglasses and particularly special purpose eyeglasses often tend to take off their eyeglasses for various periods of time. When people take off their eyeglasses for relatively short periods of time, one common practice is to hang the eyeglasses from the wearer's shirt by hooking one of the temples of the eyeglasses over the collar or other portion of the wearer's shirt. This generally works well in sedentary situations. However, this often does not work well when the wearer is in motion. When the wearer is in motion, this temple of the eyeglasses can move or swing open sufficiently to enable the eyeglasses to disengage from the shirt and tumble to the ground. The inventor of the present disclosure experienced this first hand when the inventor was mowing his lawn. The inventor's eyeglasses fell off the inventor's shirt and were destroyed by the lawn mower blades. The subsequent sight of inventor's relatively expensive eyeglasses emerging, mangled and shattered, from underneath the lawnmower inspired the inventor to find a better way of holding eyeglasses when not in use.

Various general categories of known eyeglass holders are currently commercially available. A first type of known eyeglass holder includes a strap configured to be worn around a wearer's neck and grips respectively attachable to both temples of the eyeglasses. A second type of known eyeglass holder includes a simple loop or ring, configured to be worn on a necklace, a chain, a pin, a magnet, or a clip.

More specifically, U.S. Pat. Nos. 2,539,922; 2,539,922; and D185,852 disclose eyeglass holders with straps. These eyeglass holders hold eyeglasses securely, despite some occasional awkwardness in taking the eyeglasses off and putting them back on. They are acceptable for casual occasions, but inappropriate at business or evening events where discreet elegance is preferable. Also, when eyeglasses hang from such a strap while dining, the lenses form a shelf at chest level and can become unwitting crumb catchers. This further diminishes their appeal in certain situations.

U.S. Pat. Nos. 3,956,795; 5,305,934; 5,860,191; 5,893,198; 5,956,812; 6,076,925; and 6,539,587 disclose eyeglass holders with a simple loop or ring. This loop or ring dangles from a necklace around a wearer's neck or from the wearer's clothing. One temple of the eyeglasses is inserted through the ring. The eyeglasses are then intended to hang vertically in the closed position, supported by one of the end pieces of the eyeglass frame, with the end piece resting on the lower portion of the ring.

Many variations of this device are currently commercially available. Certain versions of this device include tacked on ornamentation that attempts to camouflage the conspicuous utility of the device (e.g., U.S. Pat. No. 5,699,140). Certain versions of this device position the ring horizontally or perpendicular to the body for easy insertion of the tip of the temple (e.g., U.S. Pat. Nos. 5,319,838; and 7,584,527), or in the fashion favored by stationary mounted holders (e.g., U.S. Pat. Nos. 4,239,167; and 5,046,696).

While simple and convenient when the wearer is sitting or standing statically, these dangling loop devices do not prevent the temple from unfolding, thus enabling the eyeglasses to slip out. The loops that hold the eyeglasses closer to the clothing (e.g., U.S. Pat. No. 4,894,887; and U.S. Patent Publication No. 20090126159) also do not prevent the temple from slipping out when the wearer bends over.

Another variation of a ring device is a fabric loop sewn directly onto the front of a shirt (e.g., U.S. Pat. No. 7,584,527). This provides more security when standing upright because the body of the wearer can resist the unfolding of the temple, but this advantage is compromised when the wearer bends over. Further, it is neither desirable nor convenient to have loops sewn onto every shirt of a wearer. One proposed solution to this problem recently commercially appeared under the name ReadeREST™. This device uses magnets instead of sewn stitches. Strong magnets on the inside and outside of the wearer's clothing attach a metal support to the wearer, enabling the device to be transferred from garment to garment. While more convenient than the sewn loop, this device retains the flaw of not protecting the glasses when the user bends over.

Certain proposed devices aim to prevent eyeglasses from falling out of the holder as a result of either the temple swinging open or the wearer bending over.

One such device is a variation of the simple ring device. U.S. Pat. No. 5,033,612 discloses adding a smaller loop or funneled enclosure, perpendicularly affixed to the back of the ring, just behind the point where the eyeglasses rest on the bottom of the ring. This smaller loop is intended to hold the inserted eyeglass temple in the closed position. The location of the smaller loop, however, can create an awkward geometry which can make insertion difficult. Further, there is some question as to the widths of eyeglass temples which such a holder can receive. Additionally, due to the structural requirement of the perpendicular loop, the visual design variations of this device are even more limited than the simple ring.

Another known variation of the ring device is disclosed in U.S. Patent Publication No. 2012/0118923. This published patent application discloses the addition of a small strap attached to the ring, which the user is expected to hook over the upward pointing temple of the eyeglass frame. The strap creates an additional, awkward step for securing the eyeglasses, and an obstacle to removing the eyeglasses from this device for ready use. It also adds yet one more aesthetic disadvantage to the ring.

Another known variation of the ring concept is disclosed in U.S. Pat. No. 6,688,507. This patent discloses a second, smaller, internal ring, mounted by a hinged mechanism to the top of the main support ring. This second ring, when closed, reduces the opening of the main ring and provides a constraint that resists vertical movement of the eyeglasses. It helps prevent a wearer's eyeglasses from being bounced out of the ring, but it provides limited resistance in the case of the temple swinging open and sliding out at inopportune moments. The additional parts reduce the ease of use and add to the cost of manufacture of this device. The functionality of this device also minimizes variation in visual design.

PCT Published Patent Application No. WO2007088124 discloses an arrangement of two flexible loops that the wearer can fold over to hold the temple at separate points. This device requires considerable patience for threading the eyeglass temples into the device and for removing them for their intended use. Aesthetically, this device is even more difficult to camouflage than the simpler ring devices.

Other proposed devices similarly aim to secure the eyeglass temple at two points, by having the wearer thread the temple through two separated holes on a flexible strap (e.g., U.S. Pat. Nos. 4,157,166; and 7,325,921). Since these devices are configured for locations like the rearview mirrors of automobiles and the straps of backpacks, wearable aesthetics are not of apparent consideration. Also, threading an object through a flexible strap entails frequent fumbling and high potential for frustration.

Another approach to the problem of preventing eyeglasses from unfolding and slipping from their holder is the use of a sleeve device. Simple variations on this concept include a rigid sleeve in the shape of a slightly flattened cylinder as shown in U.S. Pat. No. 2,818,621, and a flexible sleeve as shown in U.S. Pat. No. 8,739,570. Both are configured to be suspended on necklaces. The lower body of the sleeve is intended to exert leverage, employing the weight of the sleeve itself, on the inserted temple of the eyeglass frames. The problem is that the eyeglass frame rests on the top of the sleeve, which is precisely the point from which the sleeve is suspended from the necklace. The pivot points of both the sleeve and eyeglass temple are on the same axis. Thus, only the weight of the sleeve is available to exert leverage. This small weight, distributed along a short moment arm, much shorter than the temple itself, provides only a minor improvement over devices like the ring or shirt collar— unless the sleeve is made to be uncomfortably heavy. Also, despite the ornamental intent of both of these sleeve devices, neither successfully conceals the conspicuousness of the primary purpose of the device.

Other sleeve devices are disclosed in U.S. Pat. Nos. 4,452,354; 4,771,515; 5,408,728; 5,414,906; 5,626,224; 6,039,173; 6,206,258; and 7,200,897; and U.S. Patent Publication No. 2013/0057823. These documents disclose various sleeve or sleeve-like mechanisms to secure glasses to a wearer or to another object, not by any dangling suspension mechanism, but with clips, pins, and the like. They are rugged, utilitarian devices that obviate the disadvantages of the pendulous sleeves at the cost of visual appeal, variability of method of attachment to a wearer's body or clothing, and ease of manufacture.

Accordingly, none of these devices provide a complete solution and satisfy various practical needs and aesthetic desires. There is thus a need for an eyeglass holder that solves all of these problems.

SUMMARY

The present disclosure provides various embodiments of an eyeglass holder which solves the above problems. In various embodiments, the wearable eyeglass holder of the present disclosure includes an oblong body with a front face and a back face, a tubular inner channel extending along the longitudinal axis of the body, and upper and lower openings. The tubular inner channel has an upper opening and a lower opening. The upper opening is on the upper portion of the front face of the body, and the lower opening is also on the front face of the body, such that the longitudinal axes of the openings intersect at an obtuse angle. A connector connects the body of the eyeglass holder to a wearer fastener that permits the body of the eyeglass holder to suspend pendulously from the wearer.

The eyeglass holder of the present disclosure provides several advantages. The wearable eyeglass holder is easy to use, reduces the risk of eyeglasses being lost or damaged, can be worn on the wearer's clothing or around the wearer's neck in a variety of ways, can be fashioned in various aesthetically pleasing configurations, and can be manufactured in a cost efficient manner.

Other objects, features and advantages of the present invention will be apparent from the following detailed disclosure, taken in conjunction with the accompanying sheets of drawings, wherein like reference numerals refer to like parts.

BRIEF DESCRIPTION OF THE FIGURES

FIG. 2 is a front view of the eyeglass holder of FIG. 1.

FIG. 10 is a back view of another example embodiment of the eyeglass holder of the present disclosure.

FIG. 11 is a back view of another example embodiment of the eyeglass holder of the present disclosure.

FIG. 12 is a back view of another example embodiment of the eyeglass holder of the present disclosure.

FIG. 13 is a back view of another example embodiment of the eyeglass holder of the present disclosure.

FIG. 19 is a front view of another example embodiment of the eyeglass holder of the present disclosure.

DETAILED DESCRIPTION

Figure 1:
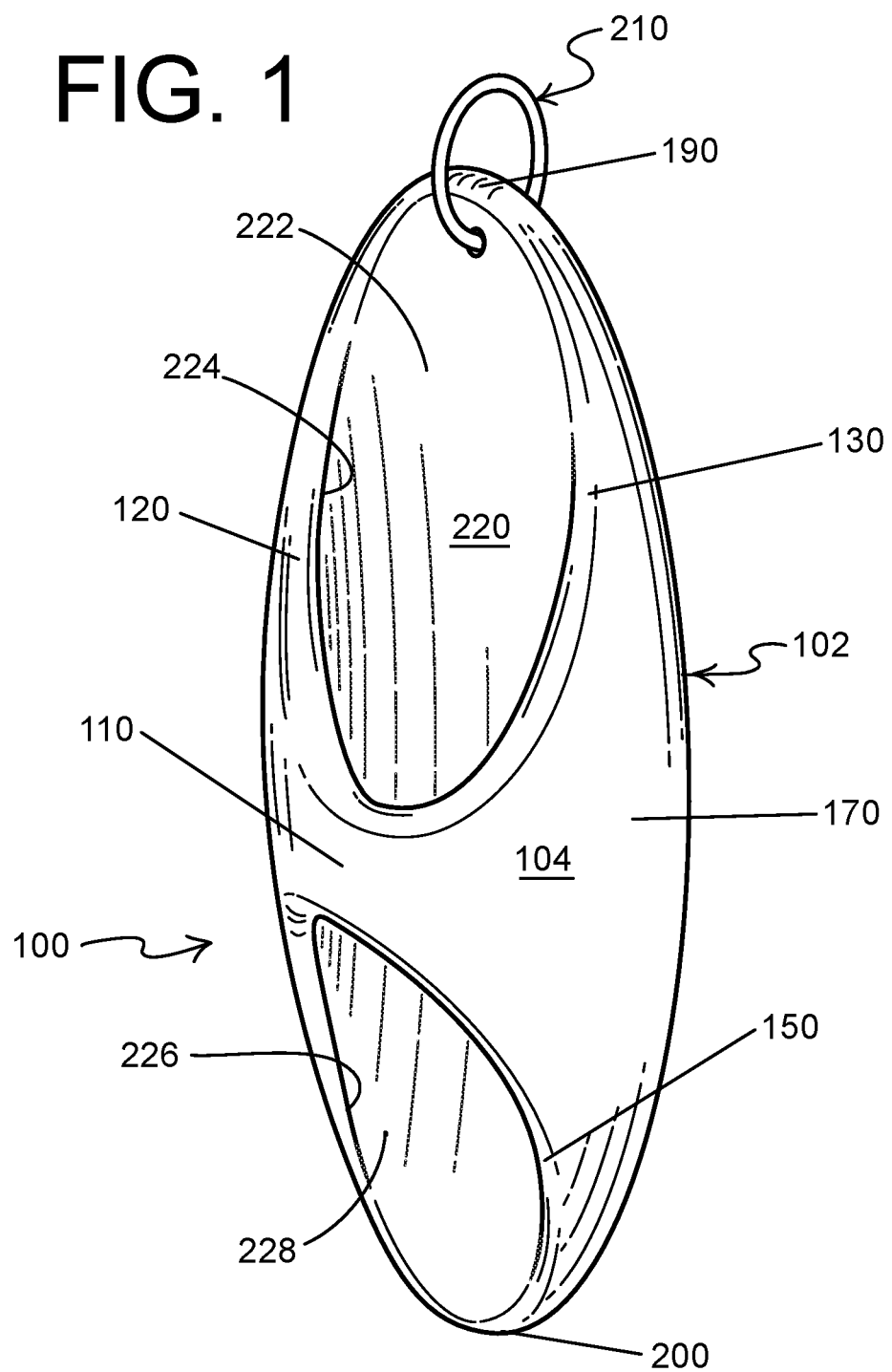
FIG. 1 is a front perspective view of one example embodiment of the eyeglass holder of the present disclosure.

Referring now to the figures, and particularly to FIGS. 1 to 9A, one example embodiment of an eyeglass holder of the present disclosure is generally illustrated and indicated by numeral 100. The eyeglass holder 100 includes an elongated generally oval tubular body 102 including: (a) a belly or waist 110; (b) a first or right arm 120 connected to and extending from the waist 110 in a first direction; (c) a second or left arm 130 connected to and extending from the waist 110 in a second different direction; (d) a first or right leg 140 connected to and extending from the waist 110 in a third different direction; (e) a second or left leg 150 connected to and extending from the waist 110 in a fourth different direction; (f) a first or right side 160 connected to and extending from the first arm 120 and the first leg 140; (g) a second or left side 170 connected to and extending from the second arm 130 and second leg 150; (h) a back 180 connected to and extending from the first arm 120, the second arm 130, the first leg 140, the second leg 150, the first side 160, and the second side 170; (i) a head 190 connected to the first arm 120, the second arm 130, and the back 180; and (j) a foot 200 connected to the first leg 140, the second leg 150, and the back 180. The belly or waist 110, the first arm 120, the second arm 130, the first leg 140, the second leg 150, the first side, the second side 170, the head 190, and the foot 200 define a generally convex front face 104 of the body 102. This front face 104 is generally convex in the top to bottom direction or dimension and in the side to side direction or dimension. The back 180, the head 190, and the foot 200 define a back face 106 of the body 102. This back face 106 is also generally convex in the top to bottom direction or dimension and in the side to side direction or dimension. The belly or waist 110, the first arm 120, the second arm 130, the first leg 140, the second leg 150, the first side 160, the second side 170, the back 180, the head 190, and the foot 200 each have an inner surface and an outer surface.

Figure 6:
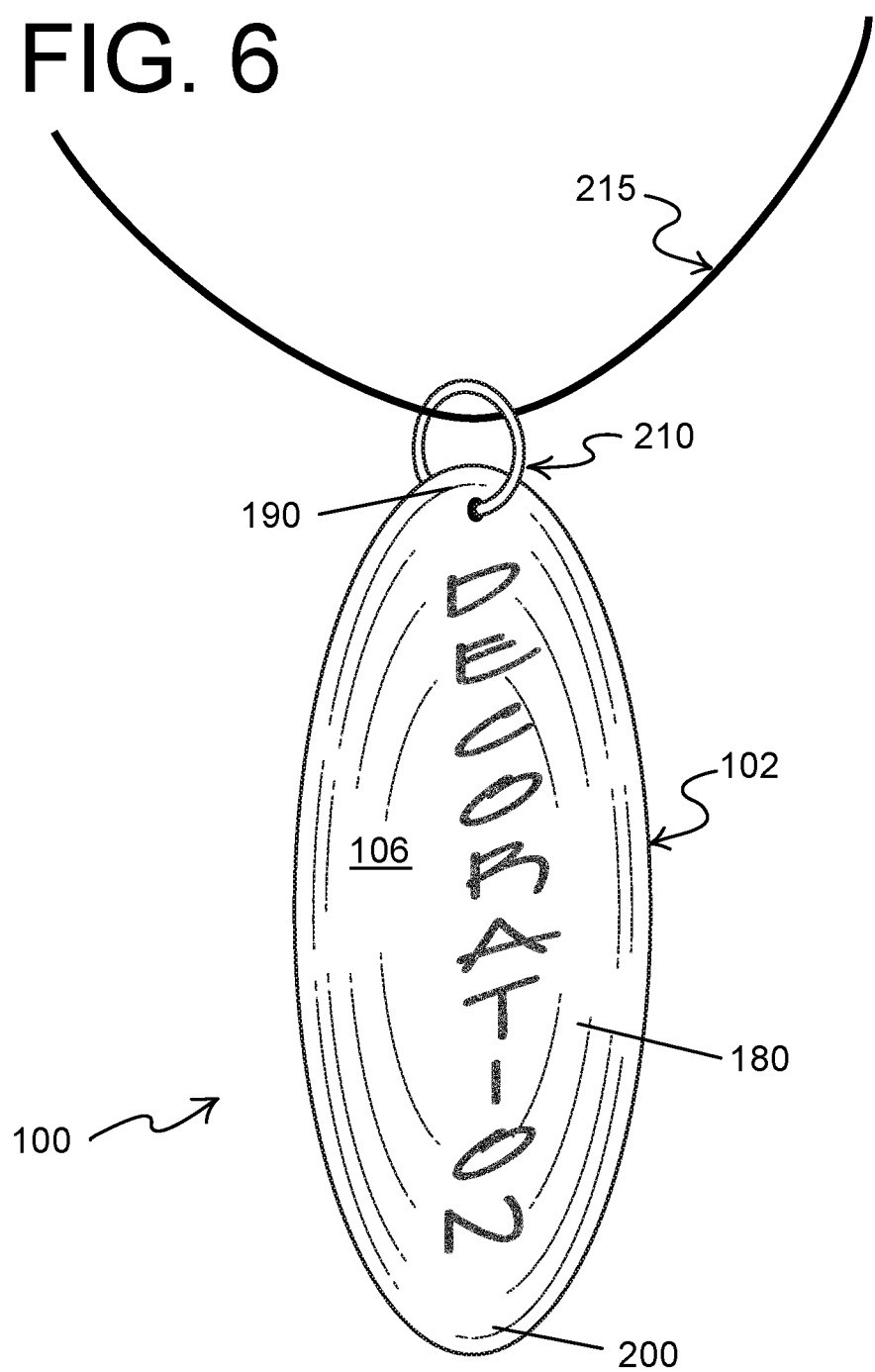
FIG. 6 is a back view of the eyeglass holder of FIG. 1 shown hanging from a necklace which is shown in fragmentary.
Figure 7:
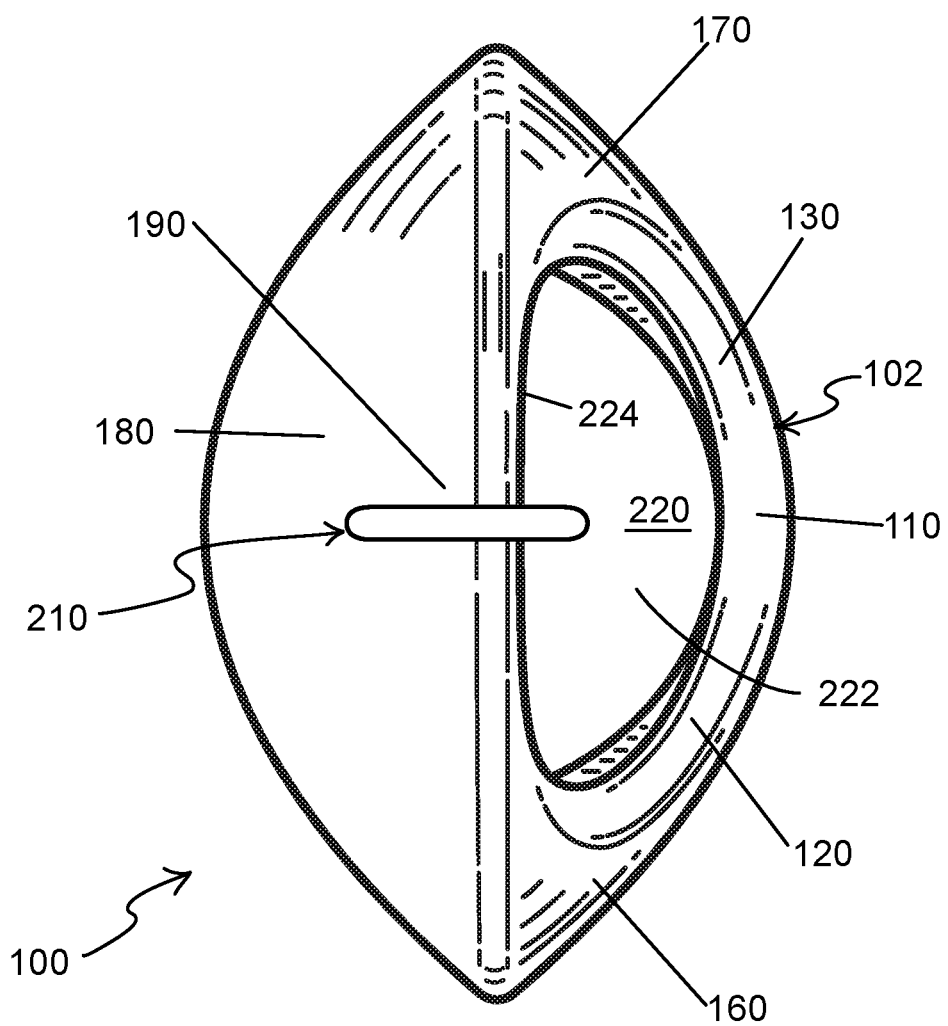
FIG. 7 is a top plan view of the eyeglass holder of FIG. 1.
Figure 8:
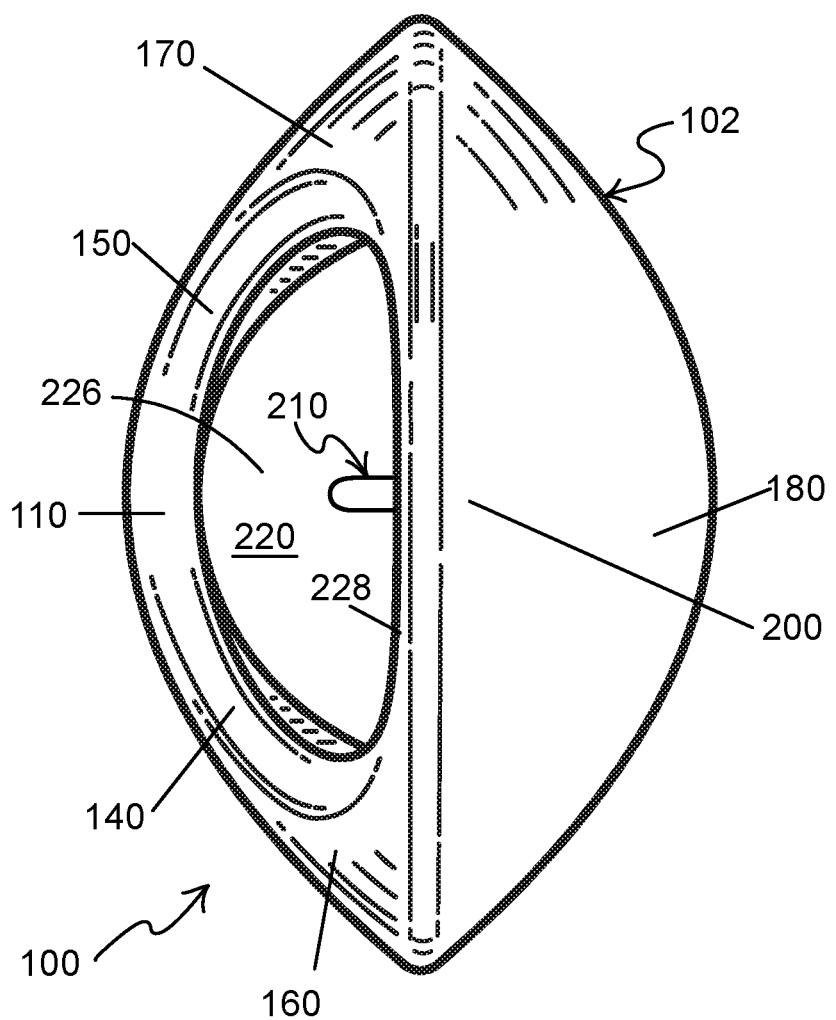
FIG. 8 is a bottom view of the eyeglass holder of FIG. 1.

This illustrated eyeglass holder 100 further includes at least one connector such as a jump ring 210 inserted through an opening or eyelet in the top portion or section of the body 102 such as in the head 190. The connector is configured to attach the body 102 of the eyeglass holder 100 pendulously to a wearer fastener such as a necklace 215 (as shown in FIG. 6) or clothing fastener (not shown) as further discussed below.

Figure 1A:
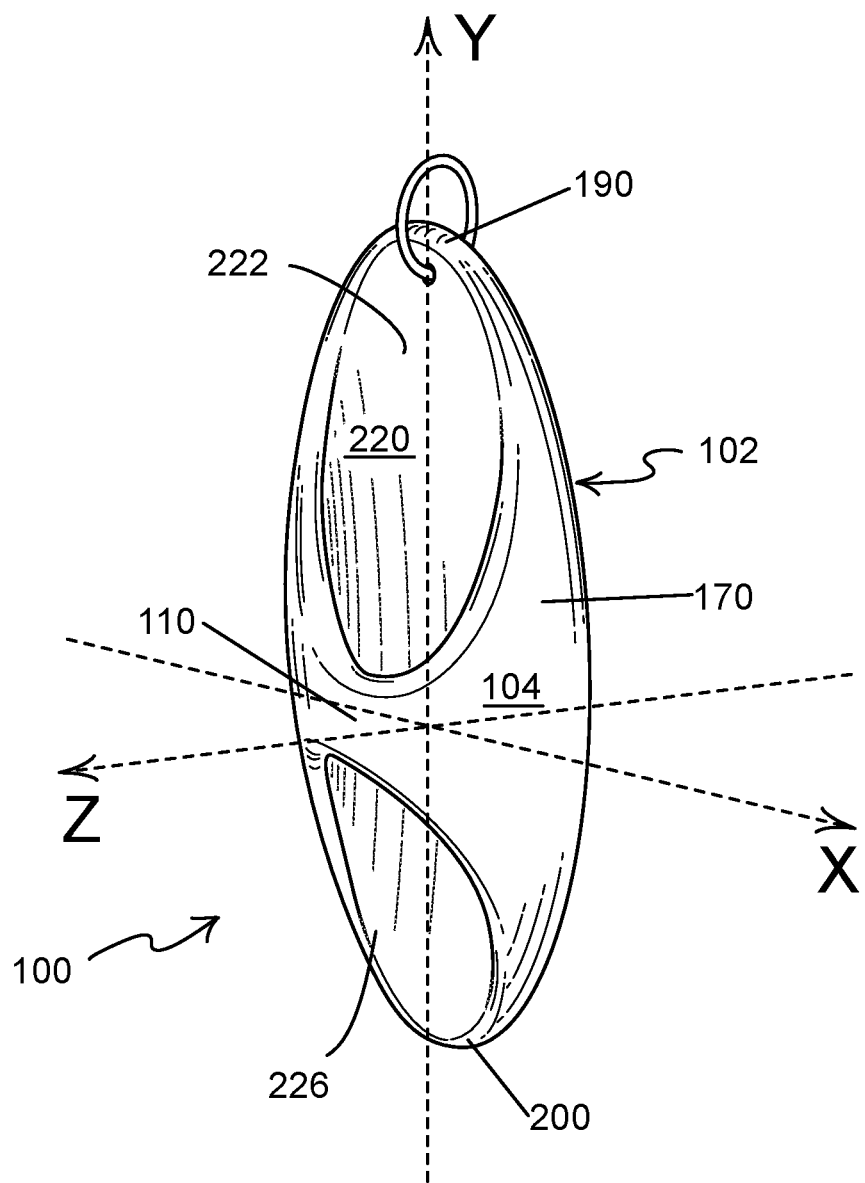
FIG. 1A is a front perspective view of FIG. 1, shown with X, Y, and Z axes.
Figure 3:
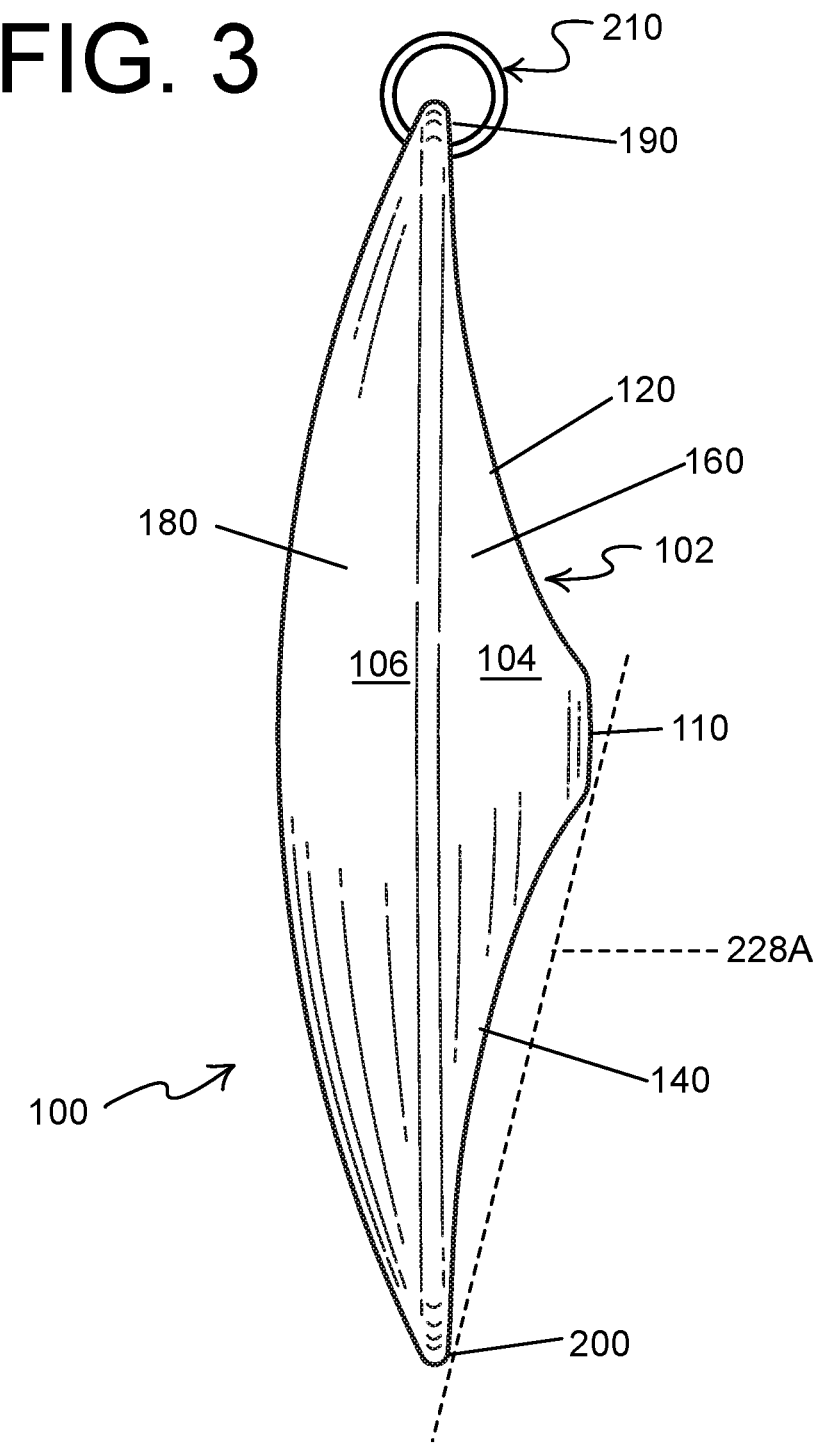
FIG. 3 is a right side view of the eyeglass holder of FIG. 1.
Figure 4:
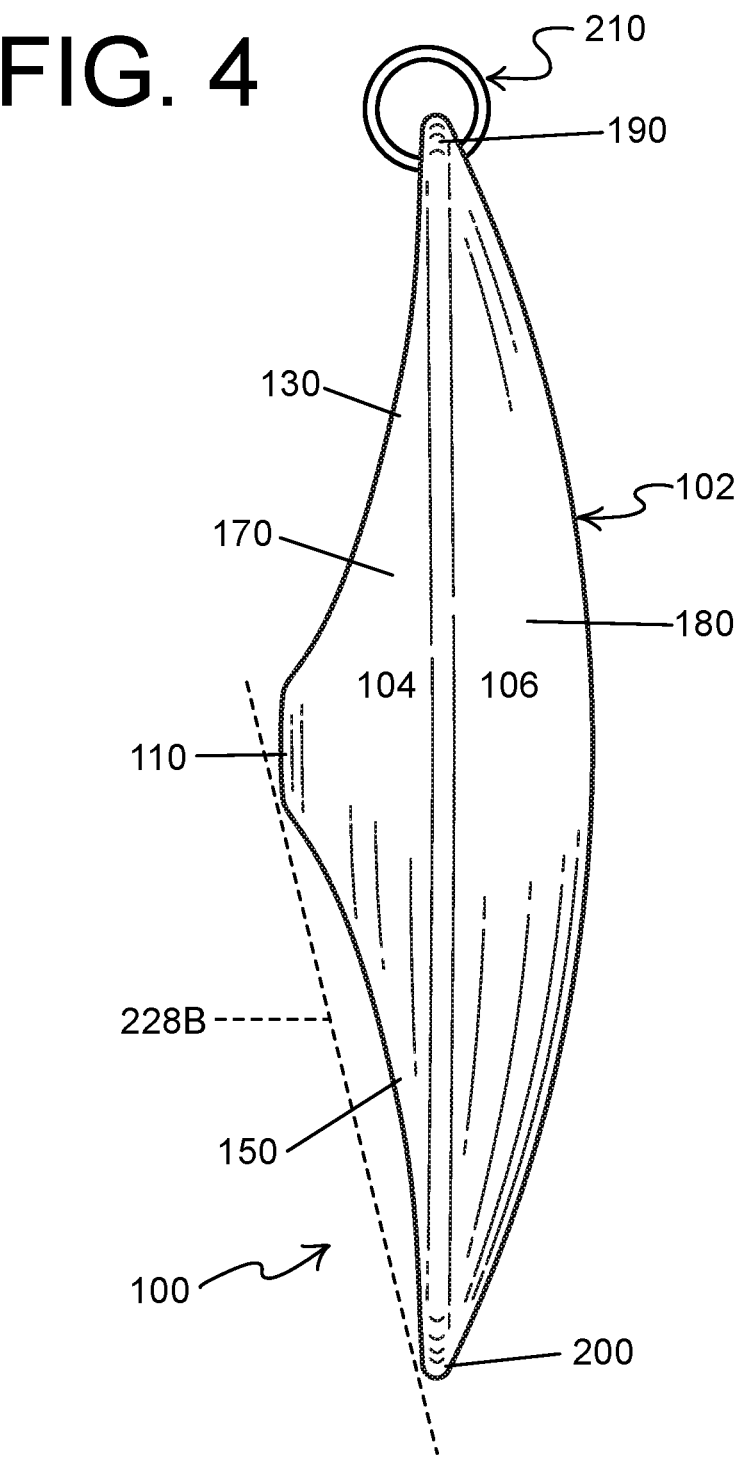
FIG. 4 is a left side view of the eyeglass holder of FIG. 1.
Figure 5:
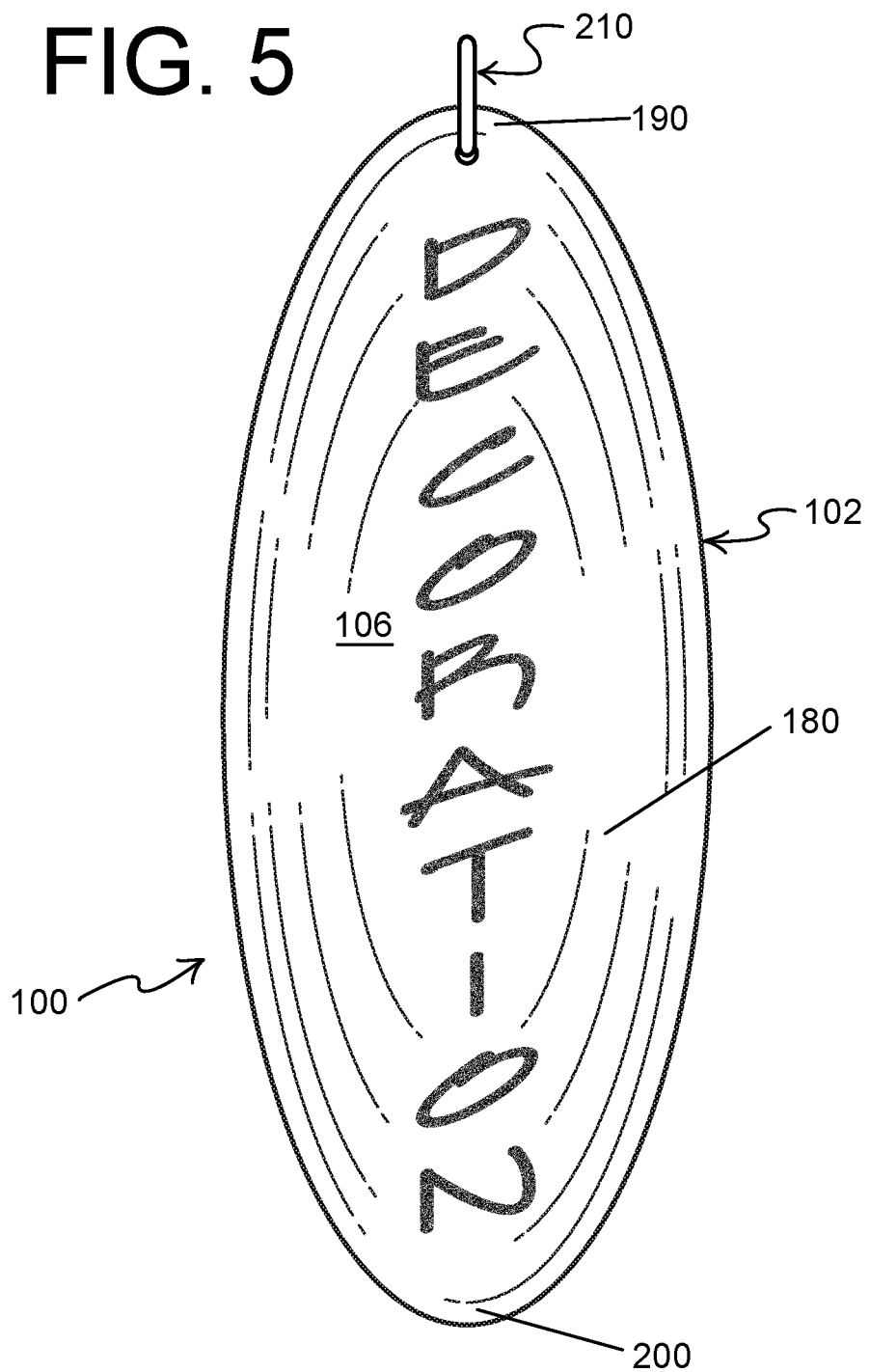
FIG. 5 is a back view of the eyeglass holder of FIG. 1.

More specifically, the tubular body 102 of the eyeglass holder 100 is generally oval in shape and has a central transverse axis or X-axis and a central longitudinal axis or Y-axis as shown in FIG. 1A. The body 102 and specifically the waist 110, the arms 120 and 130, the legs 140 and 150, the sides 160 and 170, the back 180, the head 190, and the foot 200 define an elongated oval longitudinal hollow inner channel 220 that passes through the body 102. The inner channel 220 has a substantially oval cross-section in the XZ plane with its longer axis perpendicular to the central longitudinal axis of the body 102. In other words, each transverse or horizontal plane extending in the channel is oval.

Figure 9:
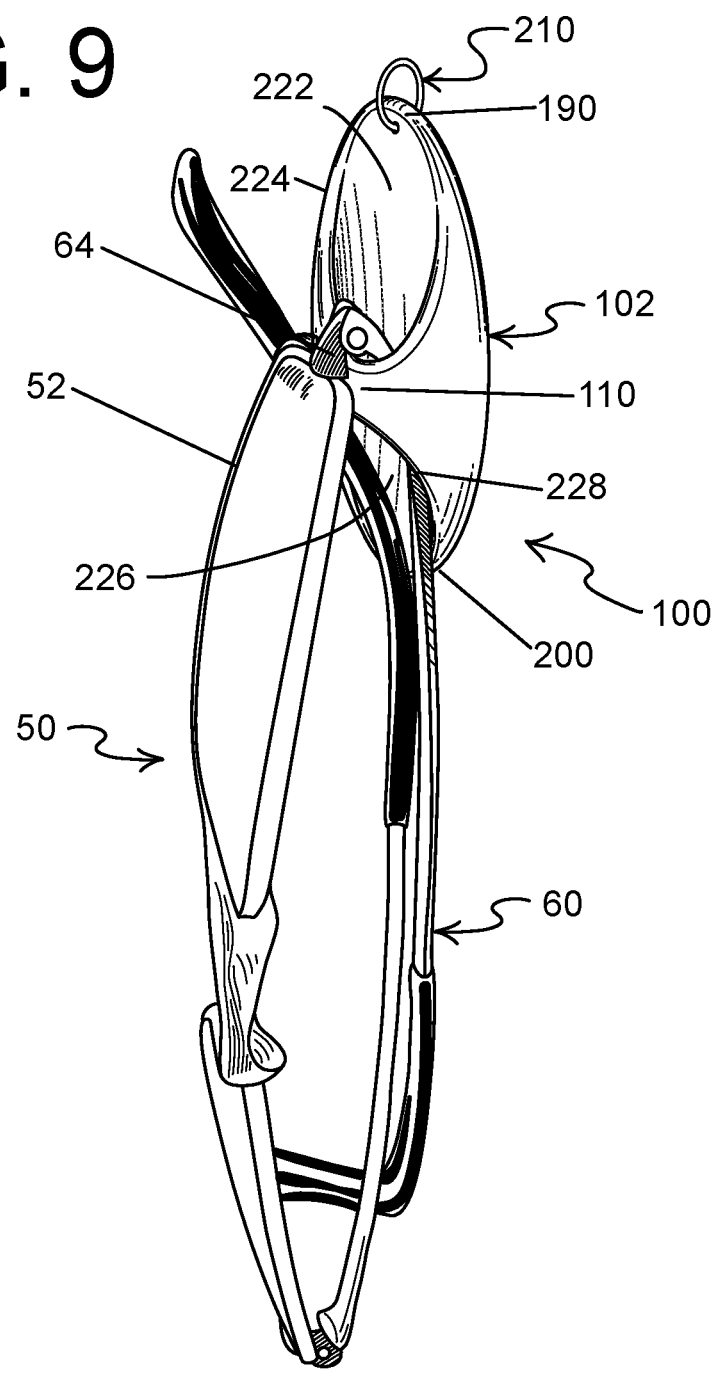
FIG. 9 is a side perspective view of the eyeglass holder of FIG. 1 shown holding a pair of eyeglasses.
Figure 9A:
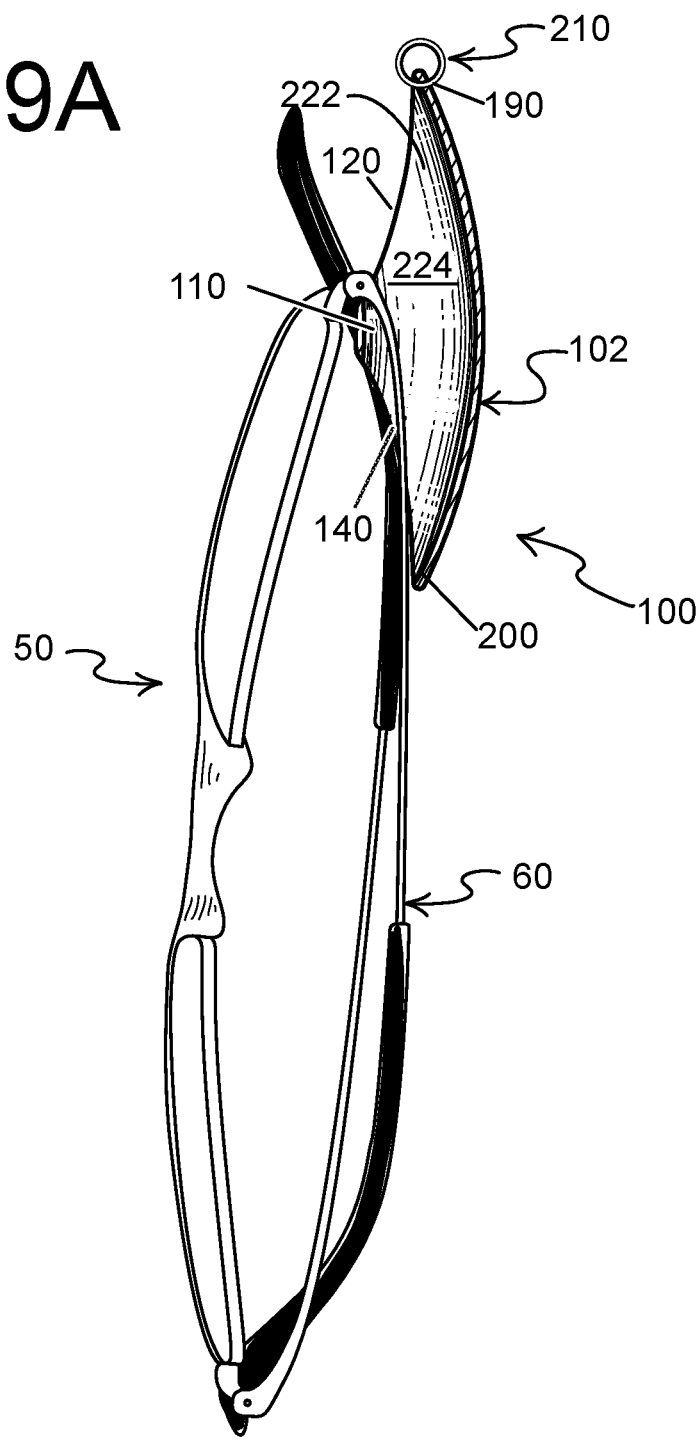
FIG. 9A is a side cross-sectional view of the eyeglass holder of FIG. 1 shown holding a pair of eyeglasses.

The inner channel 220 has an oval upper opening 222 (with its longitudinal axis being longer than its width). The oval upper opening 222 is defined by an upper rim 224 formed by the edges of the waist 110, the first arm 120, the second arm 130, and the head 190. The oval upper opening 222 opens on the front face of the body 102. The longitudinal axis of the upper opening 222 lies on the center longitudinal plane or YZ plane of the body 102. The rim 224 which defines the upper opening 222 has a suitable curvature and is smooth in this illustrated embodiment, but in other embodiments the rim may be alternatively configured, such as to support decorative treatments. The upper opening 222 is of a suitable shape and size to receive a temple of eyeglasses such as the temple 60 of the eyeglasses 50 as shown in FIG. 9 and further discussed below.

The inner channel 220 also has an oval lower opening 226 (with its longitudinal axis being longer than its width). The oval lower opening 226 is defined by a lower rim 228 formed by the edges of the waist 110, the first leg 140, the second leg 150, and the foot 200. The oval lower opening 226 also opens on the front face of the body 102. The longitudinal axis of the lower opening 226 lies on the center longitudinal plane or YZ plane of the body 102 and intersects the longitudinal axis of the upper opening 222 at an obtuse angle. The rim 228 which defines the lower opening 226 has a suitable curvature and is smooth in this illustrated embodiment, but in other embodiments the rim may be alternatively configured, such as to support decorative treatments. The lower opening 226 is of a suitable shape and size to receive a temple of eyeglasses such as the temple 60 of the eyeglasses 50 as shown in FIG. 9 and further discussed below.

The tubular body 102 of the eyeglass holder 100 generally has a greater height than width (i.e., has a central transverse axis and a central longitudinal axis which is longer than the central transverse axis). The tubular body 102 of the eyeglass holder 100 is also generally wider at its central portion than at its head or top portion when viewed from the front or the back and when viewed from the left side and the right side. The tubular body 102 of the eyeglass holder 100 is also wider at its central portion than at its foot or lower portion when viewed from the front or the back and when viewed from the left side and the right side. In other words, the central portion of the body 102 is wider than the head 190 and the foot 200 in all three different directions or dimensions (i.e., from side to side, from top to bottom, and from front to back). The centerline of the inner channel 220 thus follows a curved path lying in the YZ plane that is concave with respect to the front face of the tubular body 102.

As indicated above, the first or right arm 120 is connected to and extends from the waist 110 in a first direction, the second or left arm 130 is connected to and extends from the waist 110 in a second different direction, the first or right leg 140 is connected to and extends from the waist 110 in a third different direction, and the a second or left leg 150 is connected to and extends from the waist 110 in fourth different direction. The first, second, third, and fourth directions are all different directions. The first and second arms 120 and 130 converge toward the waist 110 and diverge away from the waist 110. The first and second legs 140 and 150 converge toward the waist 110 and diverge away from the waist 110. In other words, the first and second arms 120 and 130 are closer together near the waist than near the longitudinal mid-point of the upper rim 224. The first and second legs 140 and 150 are also closer together near the waist 110 than near the longitudinal mid-point of the lower rim 226.

The first arm 120 is angled in the XY plane such that the lower portion of the first arm 120 is spaced farther apart from or at a greater distance from the back 180 than the upper portion of the first arm 120. The second arm 140 is angled in the XY plane such that the lower portion of the second arm 140 is spaced farther apart from or at a greater distance from the back 180 than the upper portion of the second arm 140. The first leg 140 is angled in the XY plane such that the upper portion of the first leg 140 is spaced apart from or at a greater distance from the back 180 than the lower portion of the first leg 140. The second leg 150 is angled in the XY plane such that the upper portion of the second leg 150 is spaced apart from or at a greater distance from the back 180 than the lower portion of the second leg 150. In this illustrated embodiment, the arms and legs thus define a substantially double-convex cross-section. In this illustrated embodiment, the arms and legs which partially define the upper and lower openings are configured somewhat like a FIG. 8 bending slightly at the waist, where the waist functions as a the support member as further discussed below.

The back 180 of the body 102 of this illustrated embodiment has a generally convex smooth continuous surface (except for the relatively small eyelet for the connector). As indicated above, the back 180 is convex in the top to bottom direction or dimension and in the side to side direction or dimension. In this embodiment, as indicated by the "DECORATION" label, the back 180 and particularly the outer surface of the back 180 is customizable or can be ornamental. For example, the smooth back face 106 of the body 102 holder can accept engraved, molded, decaled, or printed images and messages for the purpose of ornamentation, communication, branding, creating souvenirs and business premiums, commemorating events, etc. It should be appreciated that that the front face 104 of the body 102, though smaller in surface area, can likewise be decorated for similar purposes. It should further be appreciated that the terms "front face" and "back face" are somewhat arbitrary and are used herein solely for descriptive purposes, with the so-called front face being the face into which the eyeglass temple is inserted. For the wearer, the terms are not limiting, as either side may be worn outward to suit the wearer's practical or ornamental preferences. Various different example ornamental back surfaces are further discussed below.

In one embodiment, the body 102 of the eyeglass holder 100 of the present disclosure is injection molded or otherwise formed such that the belly or waist 110, the first arm 120, the second arm 130, the first leg 140, the second leg 150, the first side 160, the second side 170, the back 180, the head 190, and the foot 200 are integrally formed and respectively connected. In other embodiments, the body of the eyeglass holder of the present disclosure is otherwise suitably formed such as by machining or by three-dimensional printing. In certain embodiments, the body of the eyeglass holder of the present disclosure is made from two or more pieces which are suitably connected.

In one embodiment, the body of the eyeglass holder of the present disclosure is formed from a rigid or semi-rigid material, such as plastic or resin. In other embodiments, the body of the eyeglass holder of the present disclosure is otherwise suitably formed from a metal, a shell, a stone, glass, wood, or any other material used in the art of body worn jewelry and accessories. It should also be appreciated that the eyeglass holder of the present disclosure can be made in any suitable color or colors.

It should also be appreciated that the configuration, shape, and size of the eyeglass holder may vary in accordance with the present disclosure. In certain embodiments, the length of the body of the eyeglass holder of the present disclosure ranges from approximately one fourth to one half the length of a conventional eyeglass temple.

As mentioned above, the connector such as the jump ring 210 is configured to be attached to the body 102 of the eyeglass holder 100 and also configured to be attached to a wearer fastener such as a necklace (such as shown in FIG. 6), a lanyard (not shown), a pin (not shown), a clip (not shown), a clasp (not shown), a magnetic device (not shown), a toggle (not shown), a zipper pull (not shown), or any other suitable device (such as any suitable device in the art of body worn jewelry). The wearer fastener is configured to pendulously suspend the body of the eyeglass holder from the wearer's neck, the wearer's clothing, or other supporting device at the wearer's disposal.

As mentioned above and as generally illustrated in FIGS. 9 and 9A, the upper opening 222 and the lower opening 226 are configured to enable a temple such as temple 60 of eyeglass 50 to pass through such openings. The adjacency or close proximity of the lower portion of the upper rim 224 which defines the upper opening 222 to the upper portion of the lower rim 228 which defines the lower opening 226, the angle of the side portion of the rim of the upper opening 222 and of the side portion of the rim of the lower opening 226, and the curvatures of the waist 110, the arms 120 and 130, and the legs 140 and 150 which define the inner channel 220 co-act to enable the bend of the temple 60 of the eyeglasses 50 to pass through the inner channel 220 without requiring the cross-sectional dimension of the channel 220 to be much larger than the largest cross-section of the temple 60. The smooth inner surface of the back 180 which partially defines the inner channel 220 also automatically guides the tip of the temple 60 through the inner channel 220 and out of the lower opening 226. The temple 60 passes through the body 102 of the eyeglass holder 100 until the end piece 58 of the eyeglasses 50, where the temple 60 connects to the rim 52, makes contact with the top of the belly or waist 110 which acts as a support member.

The body 102 of the eyeglass holder 100 engages or holds the temple 60 at multiple points. More specifically, the body 102 of the eyeglass holder 100 engages or holds the temple 60 at the waist or belly 110 and at the foot 200 to prevent the unintentional unfolding of the eyeglasses in the following manner. The curved or sloped rims or edges of the arms 120 and 140 which form the rim 224 which defines the upper opening 222 direct the supported eyeglasses 50 to migrate to the longitudinal center of the belly or waist 110 when acted upon by gravity or inertial force. Correspondingly, the curved or sloped edges of the legs 140 and 150 which form the rim 228 which defines the lower opening 226 direct the contacted portion of the inserted temple 60 to migrate to the longitudinal center of the lower rim of the lower opening 226. Thus, the temple 60 is encouraged to maintain an alignment with the longitudinal axis of the body 102. The foot 200 or lower portion of the rim 228 which partially defines the lower opening 226 acts to maintain the temple piece 60 in a closed position. The foot 200 or lower portion of the rim 228 is assisted by weight or inertial force of the eyeglasses 50, using the leverage inherently generated by the configuration of the body 102 of the eyeglass holder 100. The belly or waist 110, where the force is being applied, is situated a suitable distance below the connector 210. This creates a moment arm, whereby the weight of the eyeglasses 50 naturally tends to pull the body 102 of the eyeglass holder 100 into an alignment along the central line of force. The foot 200 or lower portion of the rim 228 which defines the lower opening 228, being a suitable distance below the belly or waist 110, naturally tends to lie farther down the line of force, which is also along the line of the inserted temple 60. Thus, the foot 200 or lower portion of the rim 228 which defines the lower opening 226 therefore remains positioned to act as a lever arm resisting the unintentional unfolding of the temple 60.

The body 102 also reduces the chance of the upward folded temple 70 interfering with the vertical alignment of the body 102 of the eyeglass holder 100 in the following manner. The front face of the body 102 of the eyeglass holder 100 is generally a convex surface as mentioned above. The oblong, or substantially oval rim 228 which defines the lower opening 228 wraps around the convex surface such that the side portions of the rim 228 (i.e., defined by the legs 140 and 150) recede away from the folded eyeglass temples 60 and 70. This is noticeable in the side views (i.e., FIGS. 3 and 4) of the lower opening 226, wherein the rim 228 which defines the opening 226 is not a flat line, indicating that it does not lie on a flat plane. Due to the rim 228 wrapping around a convex shape, the side view has or takes on a somewhat concave aspect with respect to the front face of the body 102 as indicated by the phantom lines 228A and 228B. This effective concavity of the rim 228, along with the convexity of the front face of the body 102 in general, enables more space for the upward folded temple 70 to lie closed than would a configuration whereby the lower portion of the front face of the body 102 or the opening were to lie on a flat plane. This lessens the possibility of the tip of the upward folded temple 70 to interfere by pressing against the body of the eyeglass holder 100 and moving it out of the substantially vertical alignment that supports a secure fit between the rim 228 which defines the lower opening 228 and the eyeglass temple 60.

To remove the eyeglasses 50, the wearer grasps the frame 52 and lifts, removing the end piece 64 from the waist 110 and the temple 60 from the inner channel 220, freeing the eyeglasses 50 for use. It should be appreciated that the wearer may need to hold the body 102 of the eyeglass holder while lifting the eyeglasses 50, depending on the exact relative sizes and shapes of the body 102 and the eyeglasses.

Referring now to FIGS. 10, 11, 12, and 13, as mentioned above, the present disclosure contemplates various different configurations of the back of the body of the eyeglass holder. FIG. 10 illustrates an example alternative back in the form of a sand dollar. FIG. 11 illustrates another example alternative back in the form of an animal and particularly a penguin. FIG. 12 illustrates another example alternative back in the form of a cartoon sun character. FIG. 13 illustrates another example alternative back in the form of a locket with an openable section. This embodiment includes a picture-frame locket with a hinged back face that opens like a traditional locket.

Figure 14:
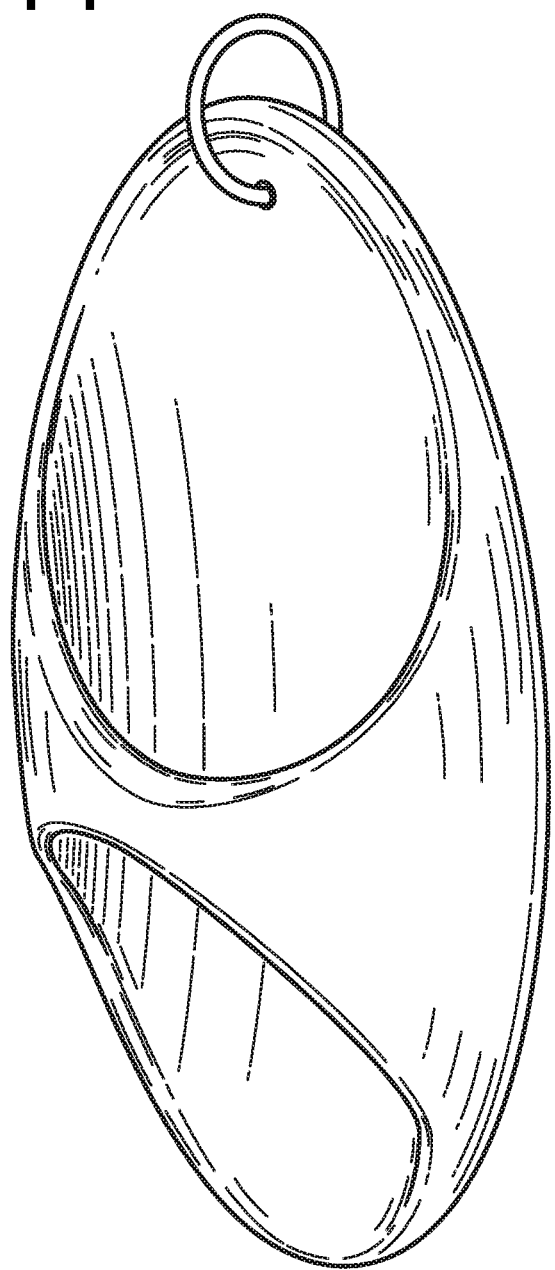
FIG. 14 is a front view of another example embodiment of the eyeglass holder of the present disclosure.
Figure 15:
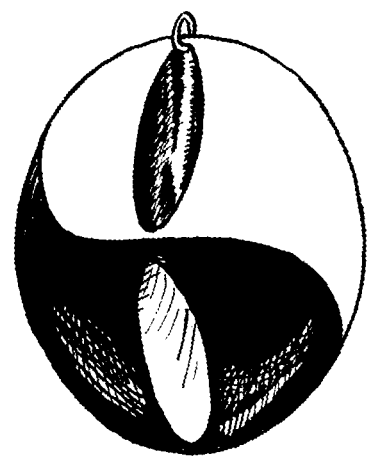
FIG. 15 is a front view of another example embodiment of the eyeglass holder of the present disclosure.
Figure 16:
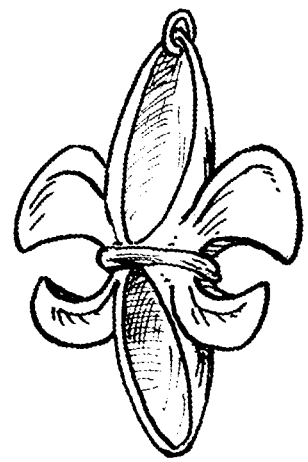
FIG. 16 is a front view of another example embodiment of the eyeglass holder of the present disclosure.
Figure 17:
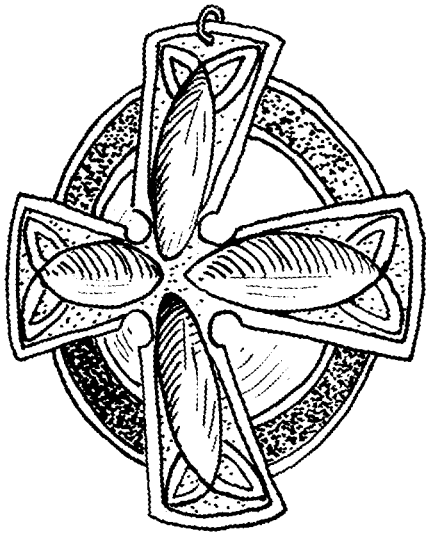
FIG. 17 is a front view of another example embodiment of the eyeglass holder of the present disclosure.
Figure 18:
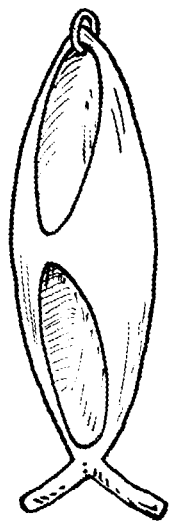
FIG. 18 is a front view of another example embodiment of the eyeglass holder of the present disclosure.

Referring now to FIGS. 14, 15, 16, 17, and 18, the present disclosure also contemplates various different configurations of the front and sides of the body as well as the entire body of the eyeglass holder. FIG. 14 illustrates another example alternative body with a wider configuration to accommodate eyeglasses with wider temples, such as RayBan's classic Wayfarer™ design. FIG. 15 illustrates another example alternative body having a yin-yang configuration and color scheme. FIG. 16 illustrates another example alternative body having a fleur de lis configuration. FIG. 17 illustrates another example alternative body with a Celtic cross configuration. FIG. 18 illustrates another example alternative body having a stylized fish configuration with a tail extending from the foot of the body.

Figure 19A:
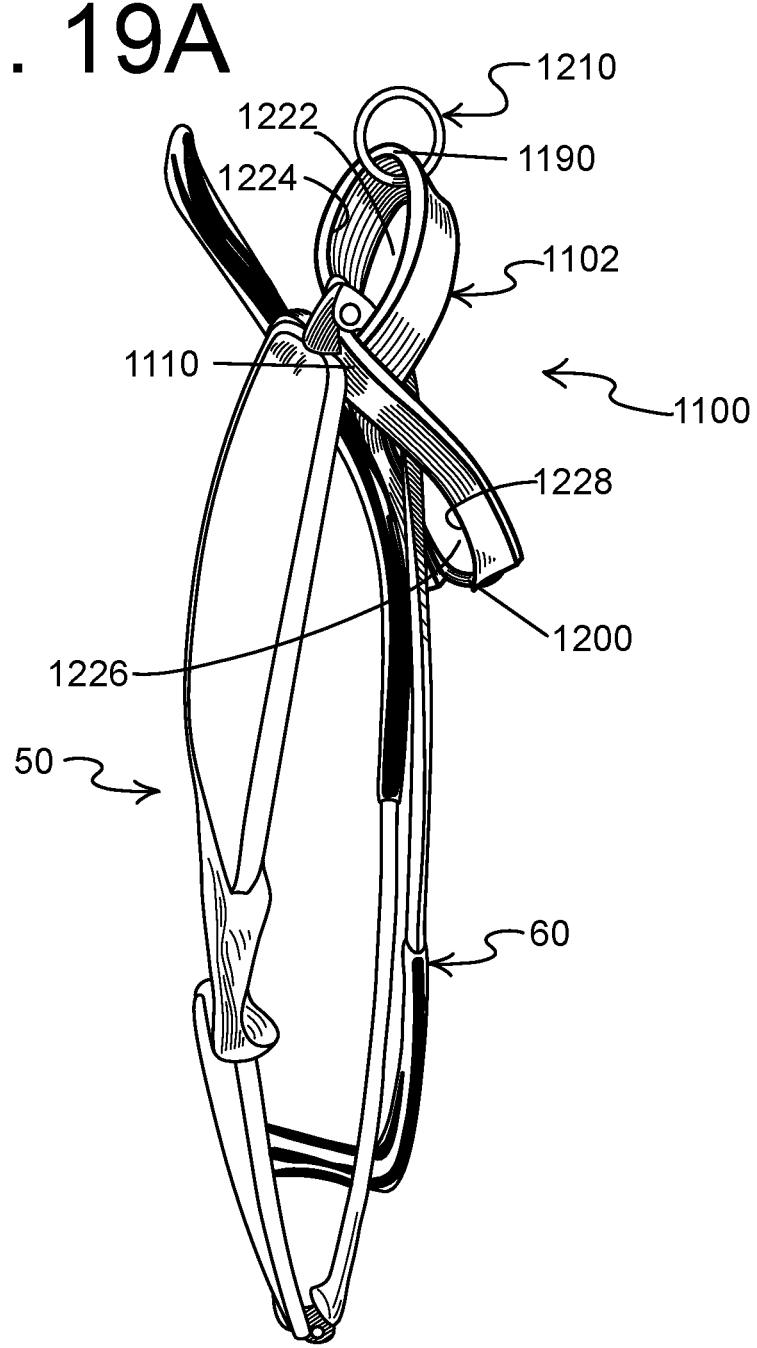
FIG. 19A is a side perspective view of the eyeglass holder of FIG. 19 shown holding a pair of eyeglasses.

In other alternative embodiments of the present disclosure, the body of the eyeglass holder is formed without sides and/or without a back such that the inner channel is not fully enclosed. Referring now to FIG. 19, another example embodiment of an eyeglass holder of the present disclosure is generally illustrated and indicated by numeral 1100. This example eyeglass holder 1100 generally includes an elongated body 1102 including: (a) a belly or waist 1110; (b) a first or right arm 1120 connected to and extending from the waist 1110 in a first direction; (c) a second or left arm 1130 connected to and extending from the waist 1110 in a second different direction; (d) a first or right leg 1140 connected to and extending from the waist 1110 in a third different direction; (e) a second or left leg 1150 connected to and extending from the waist 1110 in a fourth different direction; (f) a head 1190 connected to the first arm 1120 and the second arm 1130; and (g) a foot 1200 connected to the first leg 1140 and the second leg 1150. The belly or waist 1110, the first arm 1120, the second arm 1130, the first leg 1140, and the second leg 1150 define a somewhat convex front face 1104 of the body 1102. This front face 1104 is generally convex in the top to bottom direction or dimension and in the side to side direction or dimension. The belly or waist 1110, the first arm 1120, the second arm 1130, the first leg 1140, the second leg 1150, the head 1190, and the foot 1200 each have an inner surface and an outer surface.

This alternative example illustrated eyeglass holder 1100 further includes at least one connector such as a jump ring 1210 inserted through an opening or eyelet in the top portion or section of the body 1102 such as in the head 1190. The connector is configured to attach the body 1102 of the eyeglass holder 1100 pendulously to a wearer fastener such as a necklace (not shown) or clothing fastener (not shown).

This embodiment is referred to as an "open-back" configuration as opposed to a "closed-back" configuration as in the embodiment of FIGS. 1 to 9. While the closed-back configuration, as mentioned above, improves the ease of using the eyeglass holder, the open-back configuration is not less secure. The two points of contact at the waist 1110 and foot 1200, which constrain the eyeglass temple, do not change for the open-back configuration. The other features and functions as described above apply to this alternative embodiment. One purpose of an open-back configuration is to serve a wearer's desire for a visual design that has the appearance of purely decorative jewelry.

Figure 20:
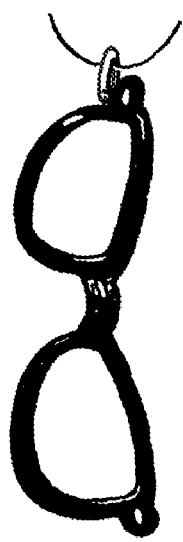
FIG. 20 is a front view of another example embodiment of the eyeglass holder of the present disclosure.
Figure 21:
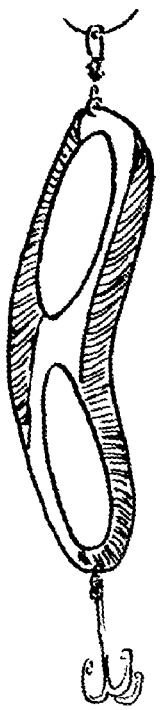
FIG. 21 is a front view of another example embodiment of the eyeglass holder of the present disclosure.
Figure 22:
FIG. 22 is a front view of another example embodiment of the eyeglass holder of the present disclosure.

Referring now to FIGS. 20, 21, and 22, the present disclosure also contemplates various different configurations of the open back configuration of the eyeglass holder. FIG. 20 illustrates an example alternative body with a second different open-back configuration which is somewhat in the form of a pair of eyeglasses. FIG. 21 illustrates another example alternative body with a third open-back configuration which is somewhat in the form of a bent fishing lure. FIG. 22 illustrates another example alternative body with a fourth different open-back configuration which is somewhat in the form of an hourglass.

Figure 23:
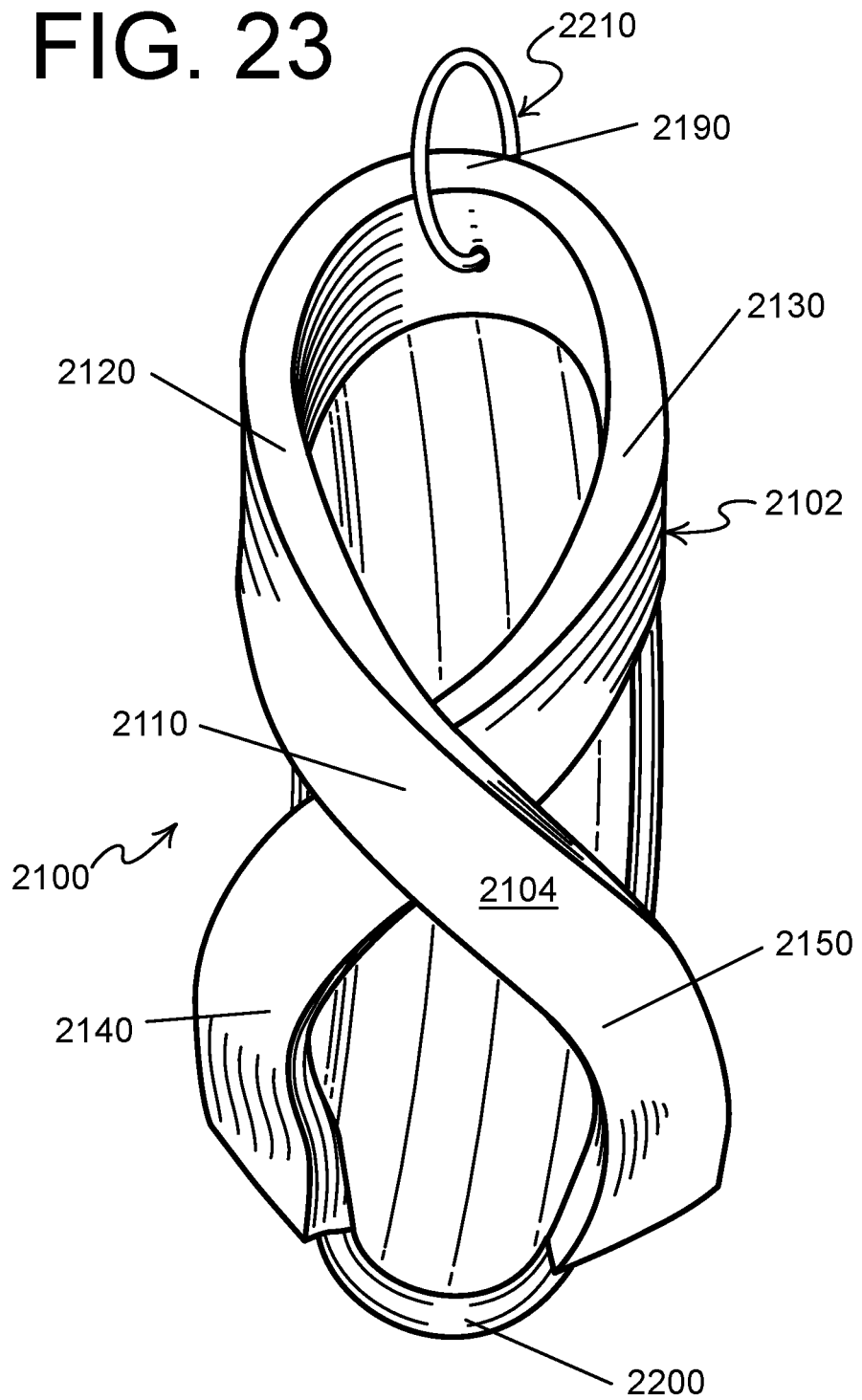
FIG. 23 is a front view of another example embodiment of the eyeglass holder of the present disclosure.

Referring now to FIG. 23, the present disclosure also contemplates various different configurations of an open-side configuration of the eyeglass holder. This example eyeglass holder 2100 generally includes an elongated body 2102 including: (a) a belly or waist 2110; (b) a first or right arm 2120 connected to and extending from the waist 2110 in a first direction; (c) a second or left arm 2130 connected to and extending from the waist 2110 in a second different direction; (d) a first or right leg 2140 connected to and extending from the waist 2110 in a third different direction; (e) a second or left leg 2150 connected to and extending from the waist 2110 in fourth different direction; (f) a head 2190 connected to the first arm 2120 and the second arm 2130; (i) a foot 2200 connected to the first leg 2140 and the second leg 2150; and (j) a back connected to the head 2190 and the foot 2200. The belly or waist 2110, the first arm 2120, the second arm 2130, the first leg 2140, and the second leg 2150 define a somewhat convex front face 2104 of the body 2102. This front face is generally convex in the top to bottom direction or dimension and in the side to side direction or dimension. This back face is generally convex in the top to bottom direction or dimension and in the side to side direction or dimension. The belly or waist 2110, the first arm 2120, the second arm 2130, the first leg 2140, the second leg 2150, the head 2190, the foot 2200, and the back 2180 each have an inner surface and an outer surface.

This alternative example illustrated eyeglass holder 2100 further includes at least one connector such as a jump ring 2210 inserted through an opening or eyelet in the top portion or section of the body 2102 such as in the head 2190. The connector is configured to attach the body 2102 of the eyeglass holder 2100 pendulously to a wearer fastener such as a necklace (not shown) or clothing fastener (not shown).

In this embodiment, the enclosure of the inner channel is accomplished with a clear material, such as a vinyl or plastic, which is bonded to the head and foot. The use of a clear material intends to make the channel visually unobtrusive. However, it should be appreciated that this embodiment can be made from other suitable materials.

Figure 24:
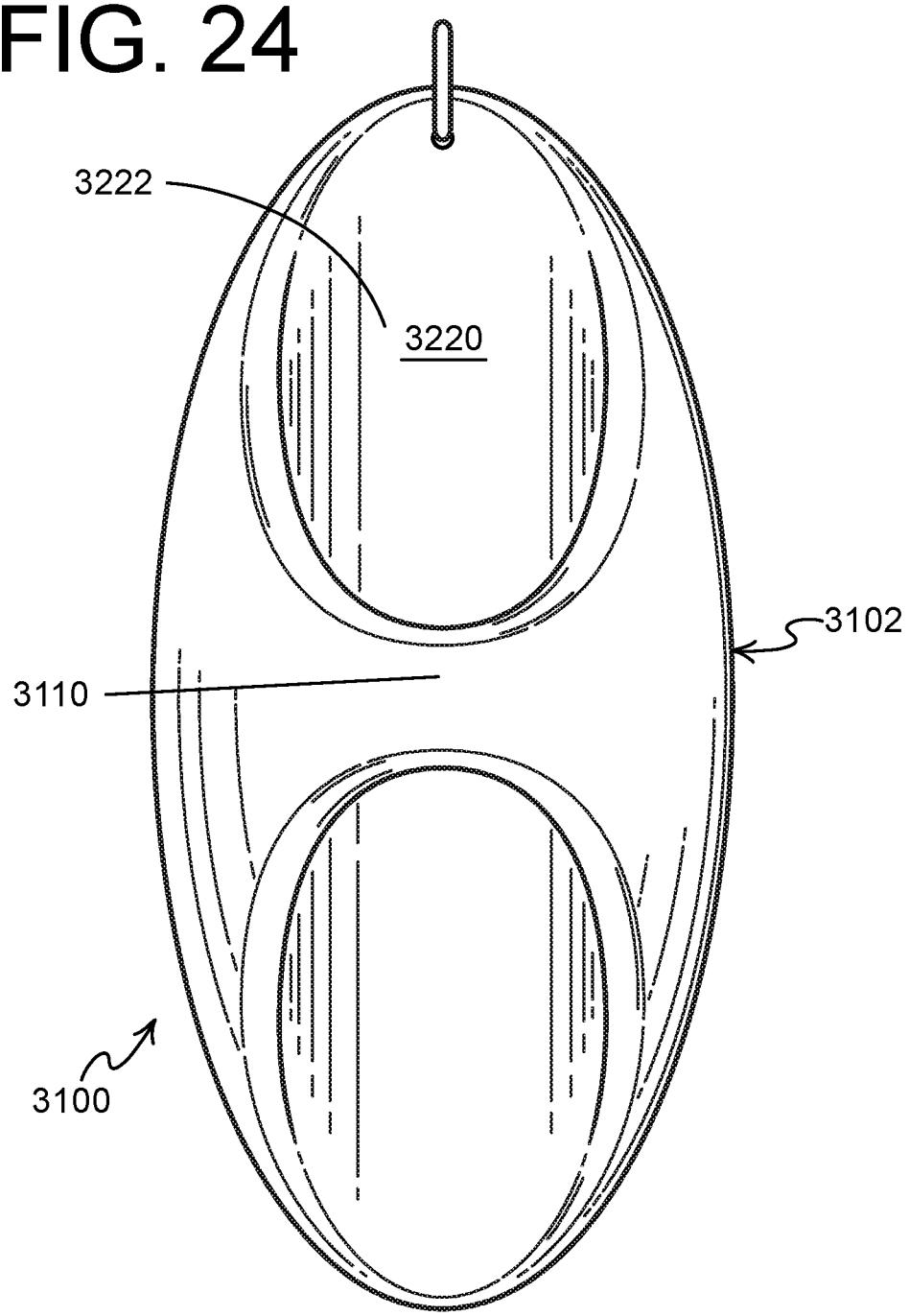
FIG. 24 is a front view of another example embodiment of the eyeglass holder of the present disclosure which is made from a resilient or flexible material.
Figure 25:
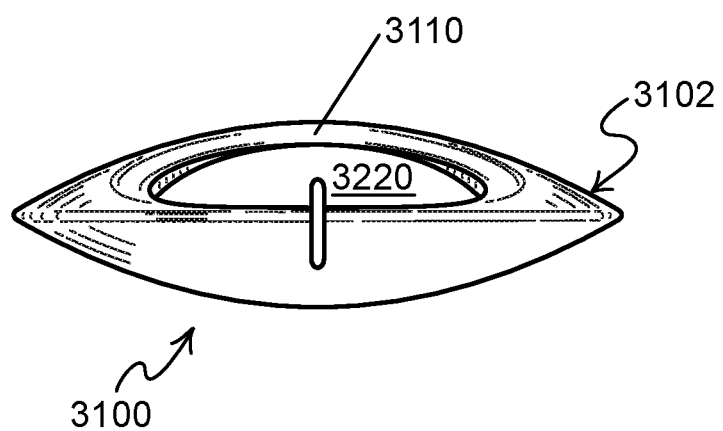
FIG. 25 is a top plan view of the eyeglass holder of FIG. 24.
Figure 26:
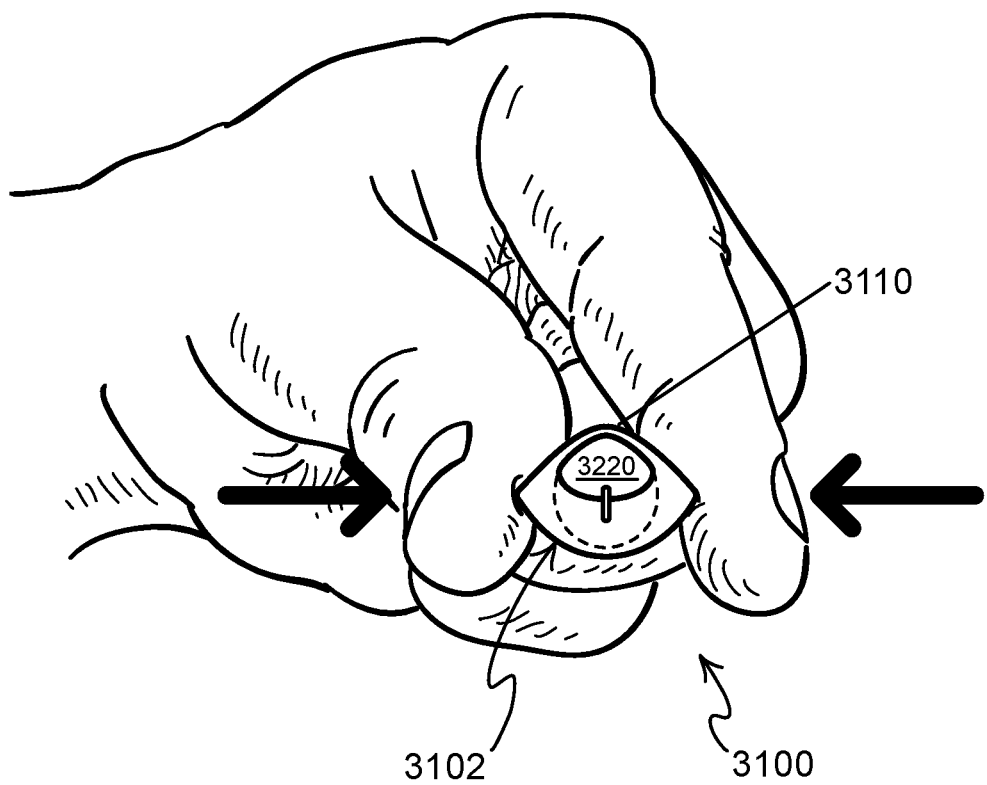
FIG. 26 is a top plan view of the eyeglass holder of FIG. 24 being squeezed by a wearer's hand prior to insertion of a temple of a pair of eyeglasses.

Referring now to FIGS. 24, 25, and 26, the present disclosure also contemplates various different resilient or flexible configurations of the eyeglass holder. In one such embodiment, the body 3102 of the eyeglass holder 3100 has a somewhat flattened cross-section, which significantly constricts the inner channel 3220. The body 3102 of the eyeglass holder 3100 of this embodiment is constructed of a resilient or flexible material, such as neoprene or other suitable firm, rubbery material. To operate, the wearer can distort the cross-section of the body 3102 by exerting pressure, with a thumb and forefinger, upon the opposite vertical edges of the body 3102 as shown in FIG. 26. In this distorted state, the body 3102 of the eyeglass holder 3100 of this embodiment approximates the shape of the body 102 of the eyeglass holder 100 in FIGS. 1 to 9. The distortion effectively enlarges the opening 3222 sufficiently to enable the passage of the temple of the eyeglasses. When the end piece of the eyeglass frame comes to rest upon the waist 3110, the wearer may release pressure on the sides of the body 3102 of the eyeglass holder 3100. The subsequent re-constriction of the inner channel 3220 causes the arms and legs and the inner surface of the back of the body 3102 to grip the temple snugly, thereby further reducing the possibility of the eyeglasses being bounced or knocked out of the body 3102 of the holder 3100.

Figure 27:
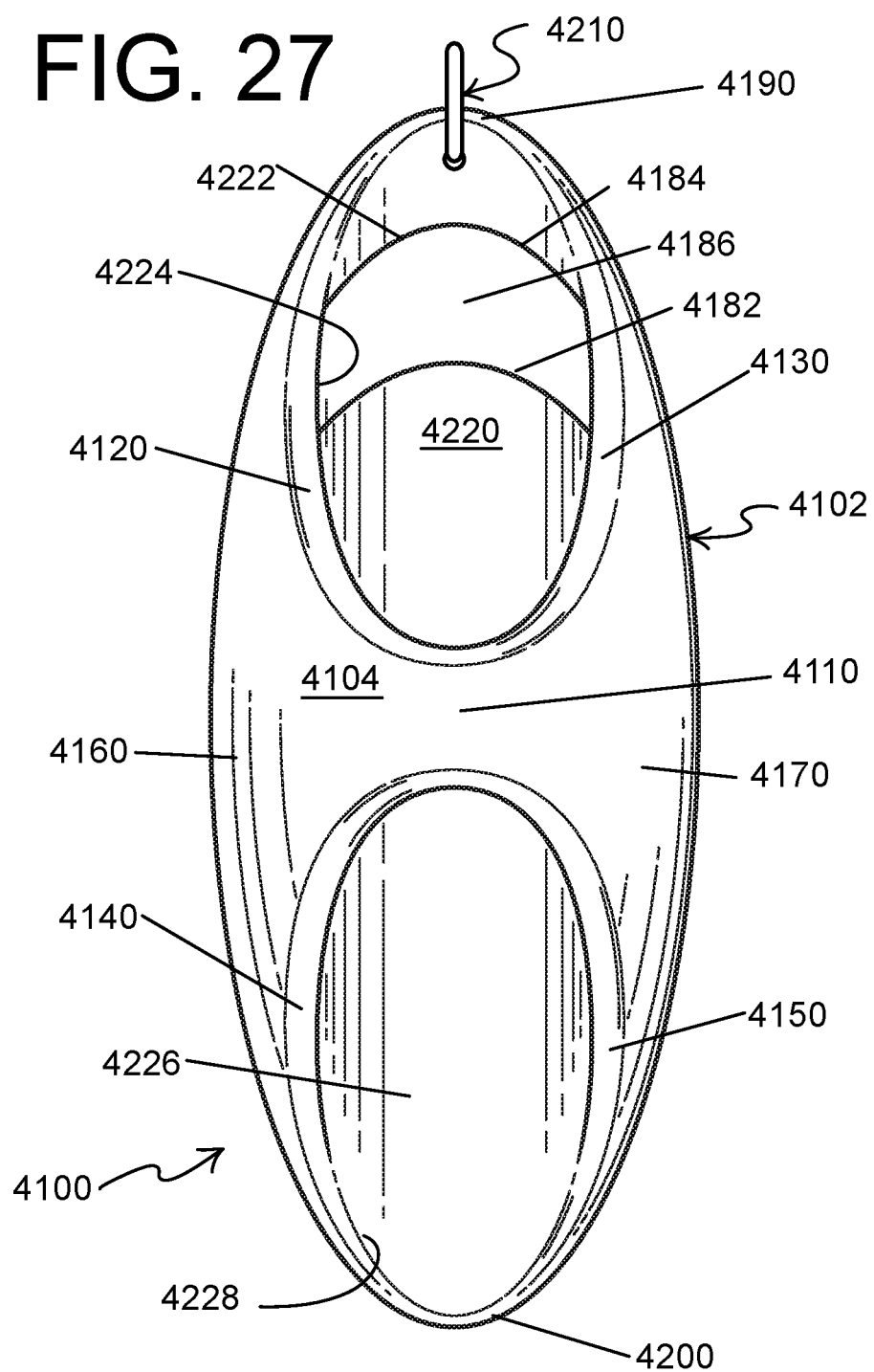
FIG. 27 is a front view of another example embodiment of the eyeglass holder of the present disclosure.
Figure 28:
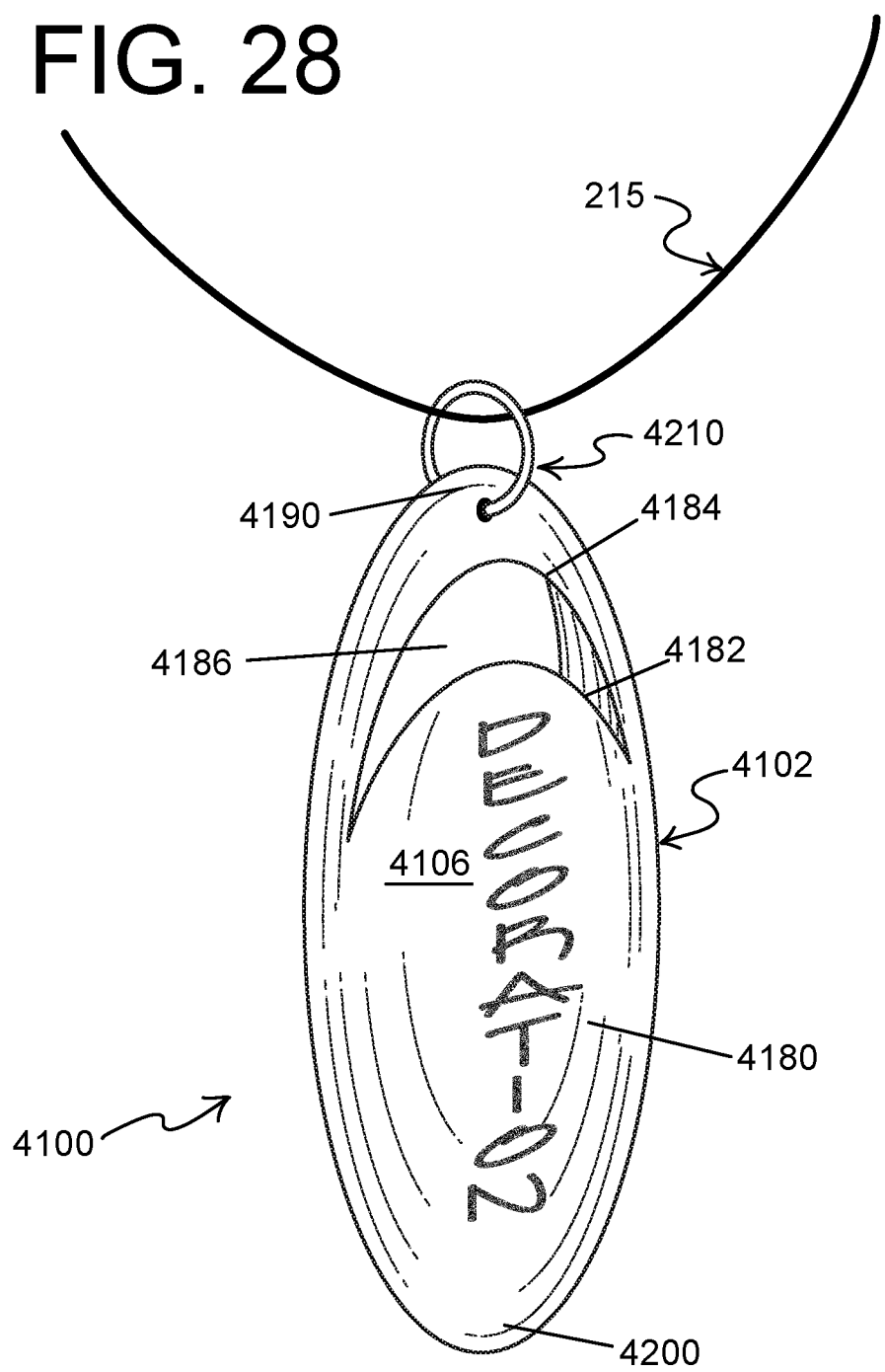
FIG. 28 is a back view of the eyeglass holder of FIG. 27.
Figure 29:
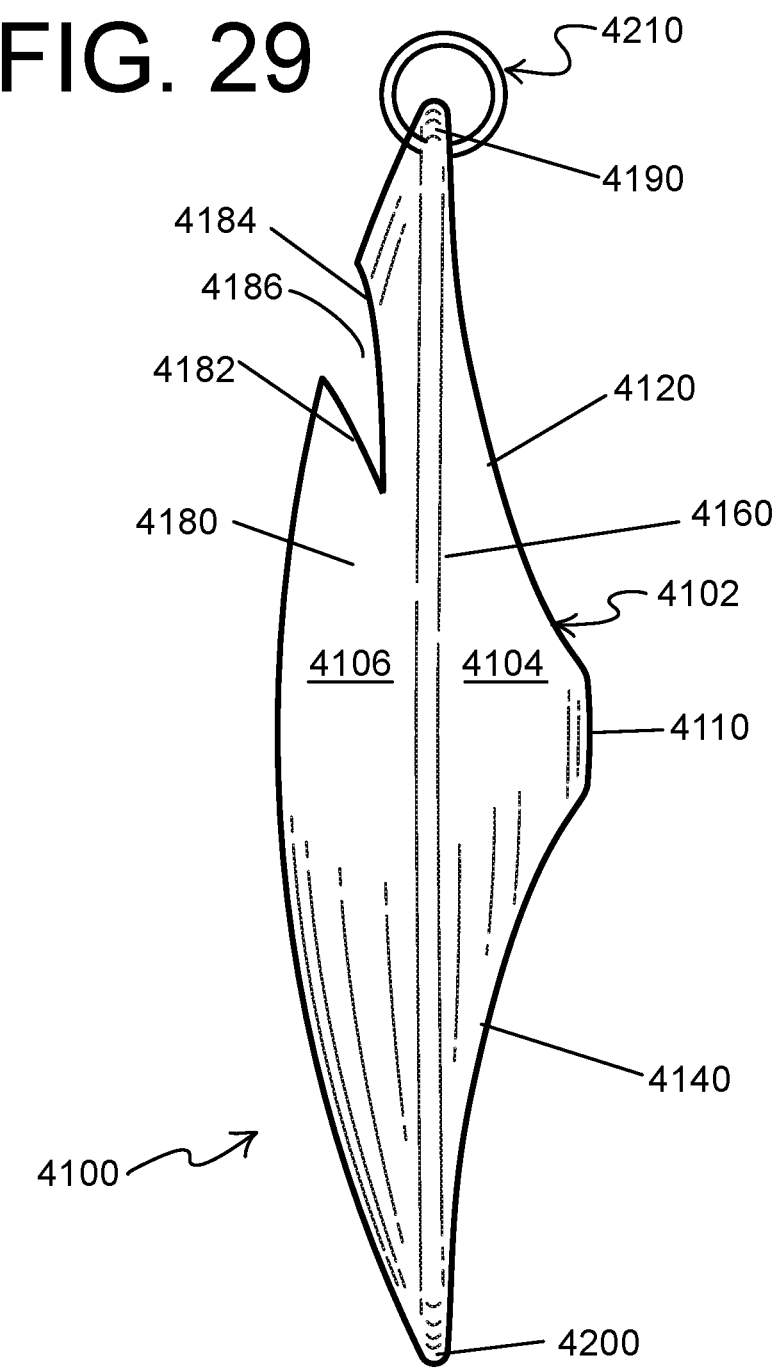
FIG. 29 is a right side view of the eyeglass holder of FIG. 27.

Referring now to FIGS. 27, 28, and 29, the present disclosure also contemplates various different other features for the eyeglass holder. In FIGS. 27, 28, and 29, the eyeglass holder 4100 includes a bottle cap opener formed in its back 4180. More specifically, the eyeglass holder 4100 includes an elongated generally oval tubular body 4102 including: (a) a belly or waist 4110; (b) a first or right arm 4120 connected to and extending from the waist 4110 in a first direction; (c) a second or left arm 4130 connected to and extending from the waist 4110 in a second different direction; (d) a first or right leg 4140 connected to and extending from the waist 4110 in a third different direction; (e) a second or left leg 4150 connected to and extending from the waist 4110 in a fourth different direction; (f) a first or right side 4160 connected to and extending from the first arm 4120 and the first leg 4140; (g) a second or left side 4170 connected to and extending from the second arm 4130 and second leg 4150; (h) a back 4180 connected to and extending from the first arm 4120, the second arm 4130, the first leg 4140, the second leg 4150, the first side 4160, and the second side 4170; (i) a head 4190 connected to the first arm 4120, the second arm 4130, and the back 4180; and (j) a foot 4200 connected to the first leg 4140, the second leg 4150, and the back 4180. The belly or waist 4110, the first arm 4120, the second arm 4130, the first leg 4140, the second leg 4150, the first side, the second side 4170, the head 4190, and the foot 4200 define a generally convex front face 4104 of the body 4102. This front face 4104 is generally convex in the top to bottom direction or dimension and in the side to side direction or dimension. The back 4180, the head 4190, and the foot 4200 define a back face 4106 of the body 4102. This back face 4106 is also generally convex in the top to bottom direction or dimension and in the side to side direction or dimension. The belly or waist 4110, the first arm 4120, the second arm 4130, the first leg 4140, the second leg 4150, the first side 4160, the second side 4170, the back 4180, the head 4190, and the foot 4200 each have an inner surface and an outer surface. The back 4180 includes a curved lower internal edge 4182 and a curved upper internal edge 4184 which form an opening 4186 in the back 4180. This configuration enables the eyeglass holder to be used to open bottles or remove bottle caps from bottles (not shown).

Figure 30:
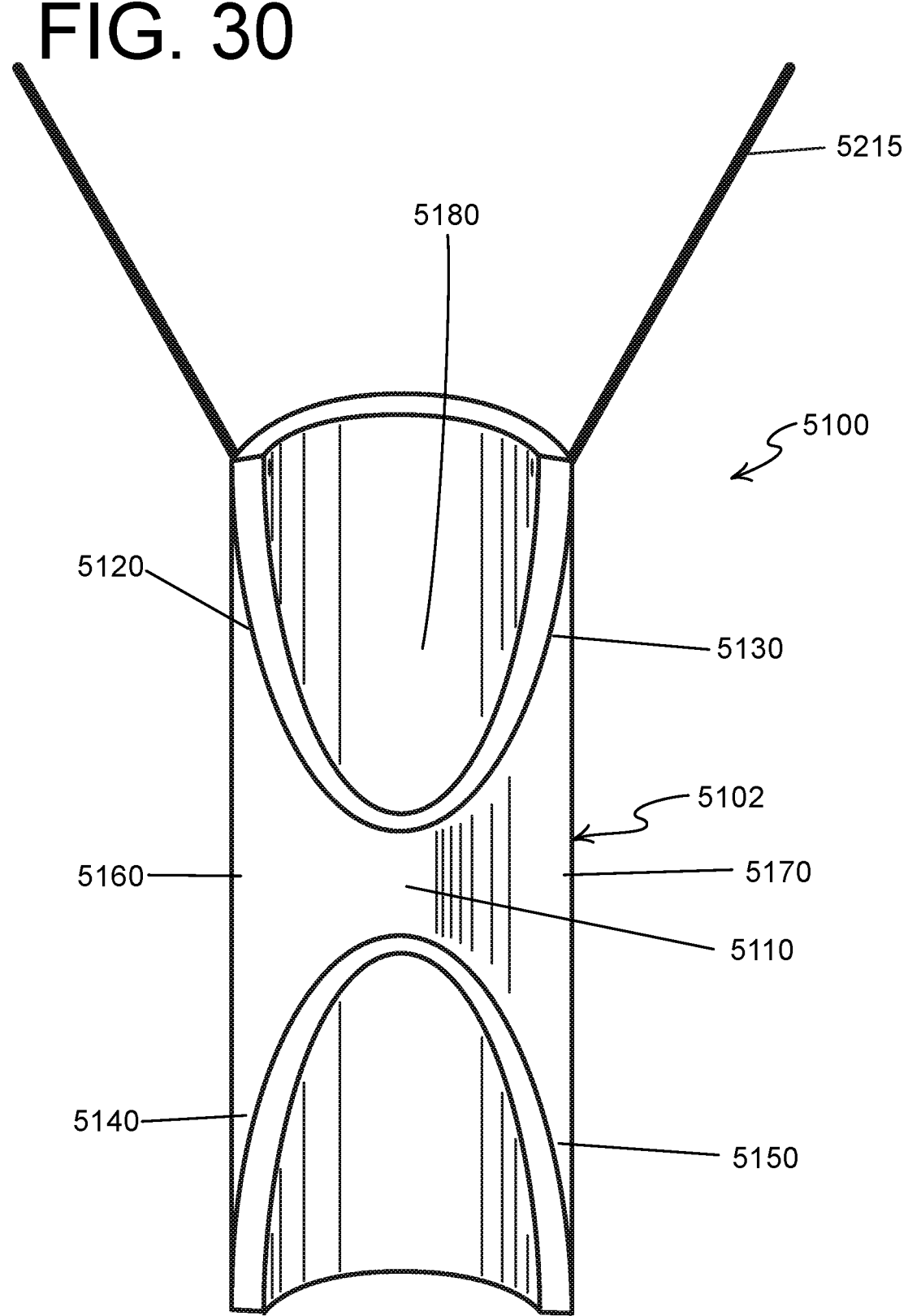
FIG. 30 is a front view of another example embodiment of the eyeglass holder of the present disclosure.
Figure 31:
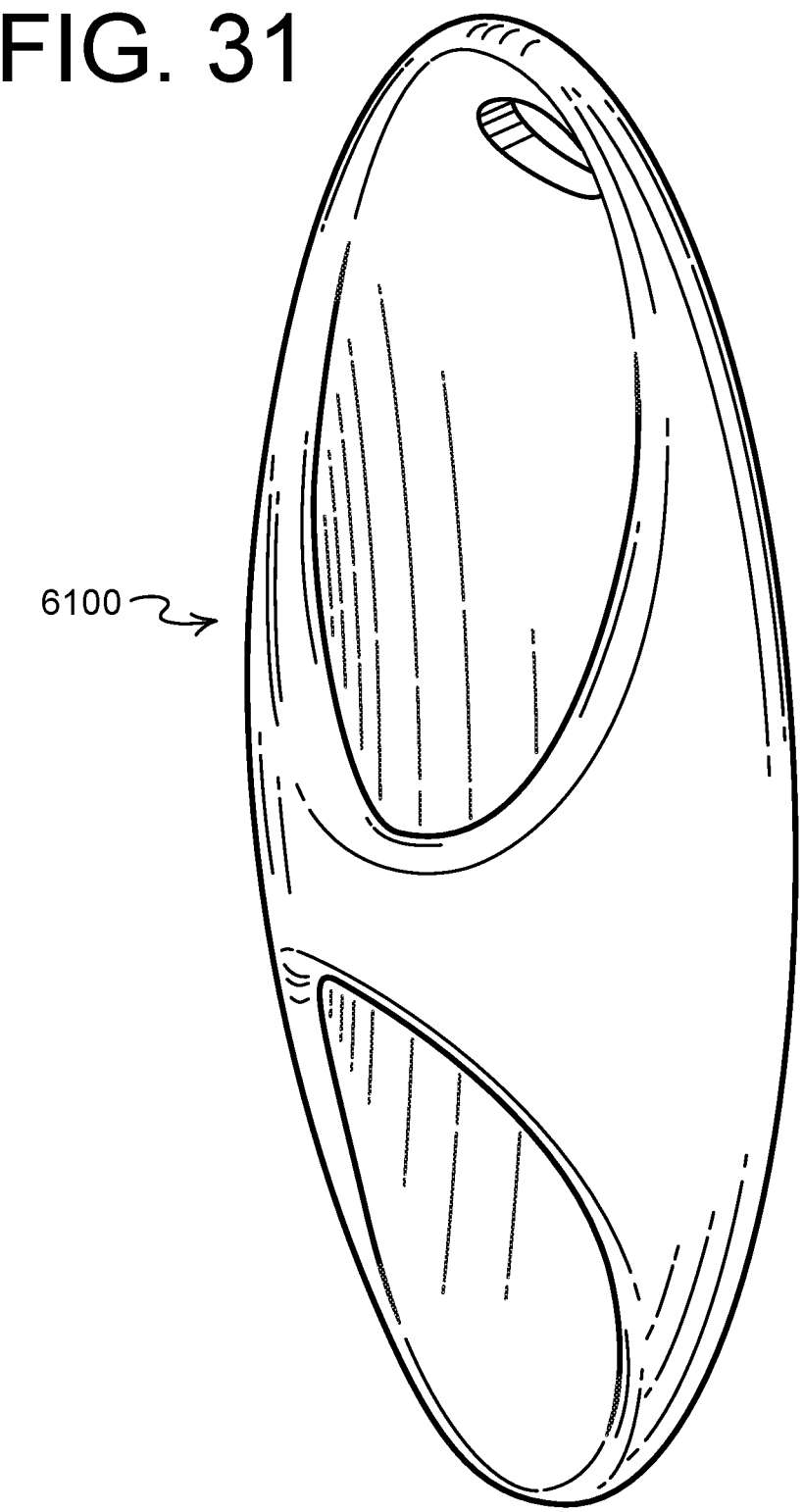
FIG. 31 is a front perspective view of another example embodiment of the eyeglass holder of the present disclosure.
Figure 32:
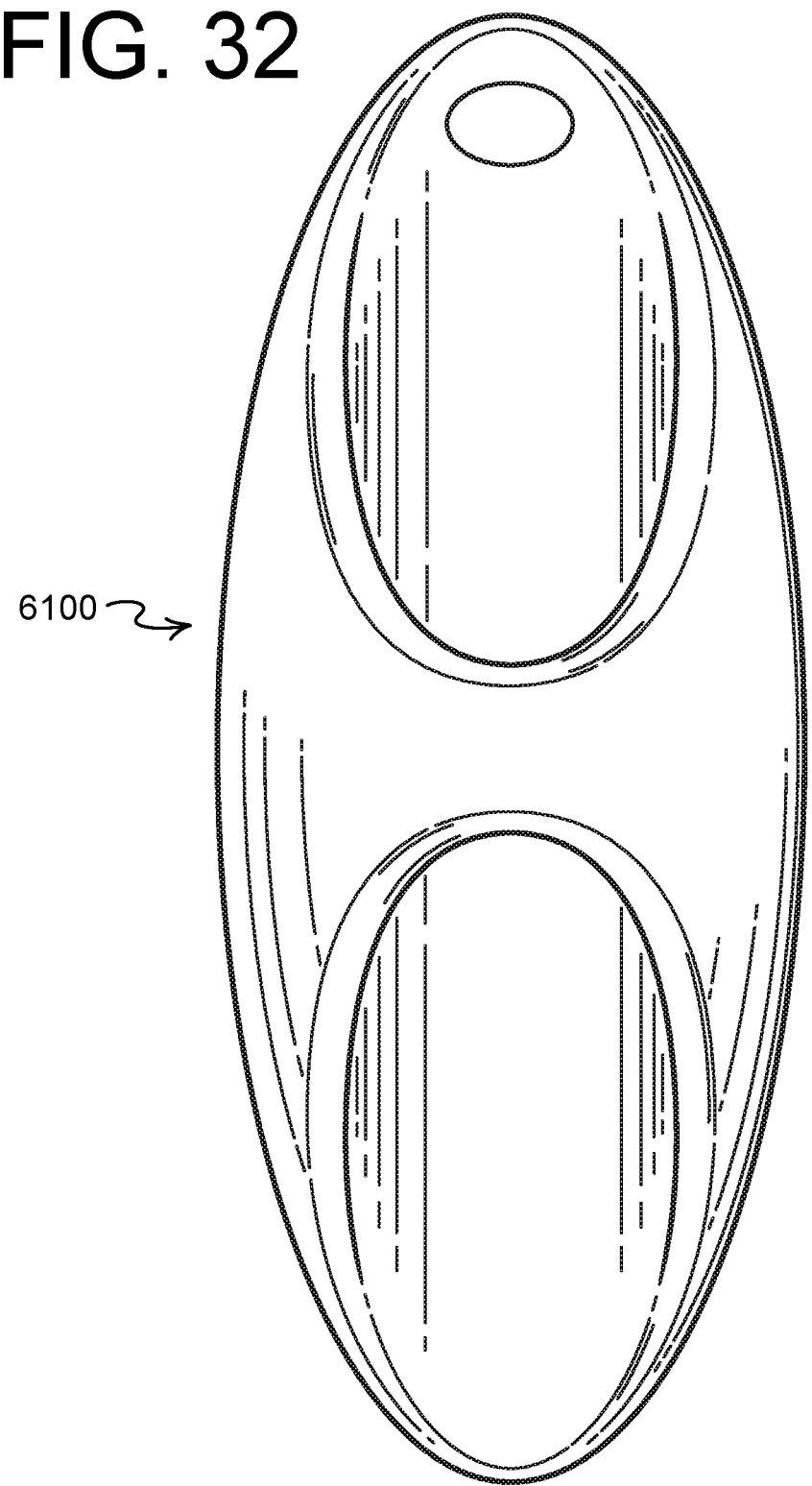
FIG. 32 is a front view of the eyeglass holder of FIG. 31.
Figure 33:
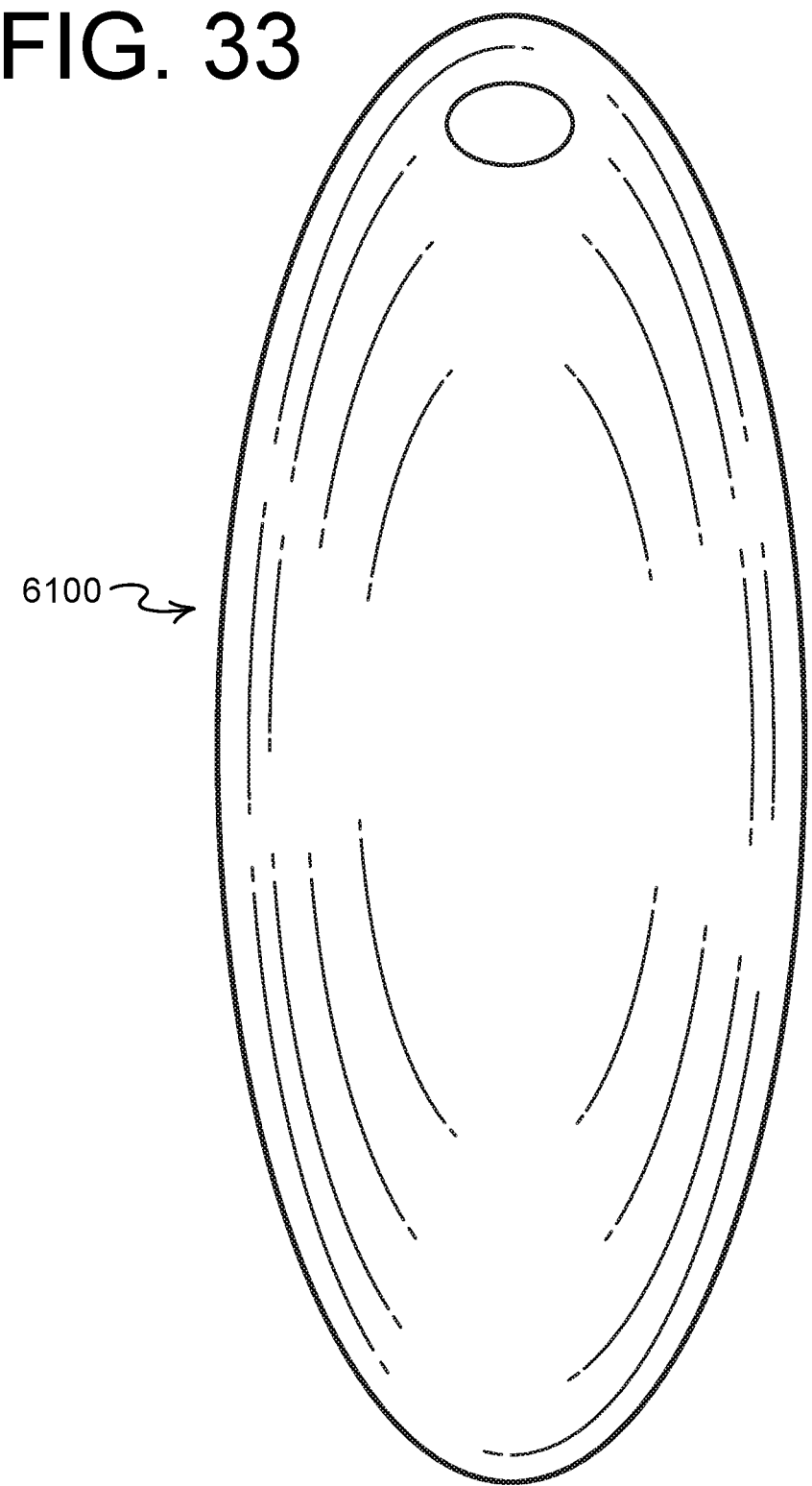
FIG. 33 is a back view of the eyeglass holder of FIG. 31.
Figure 34:
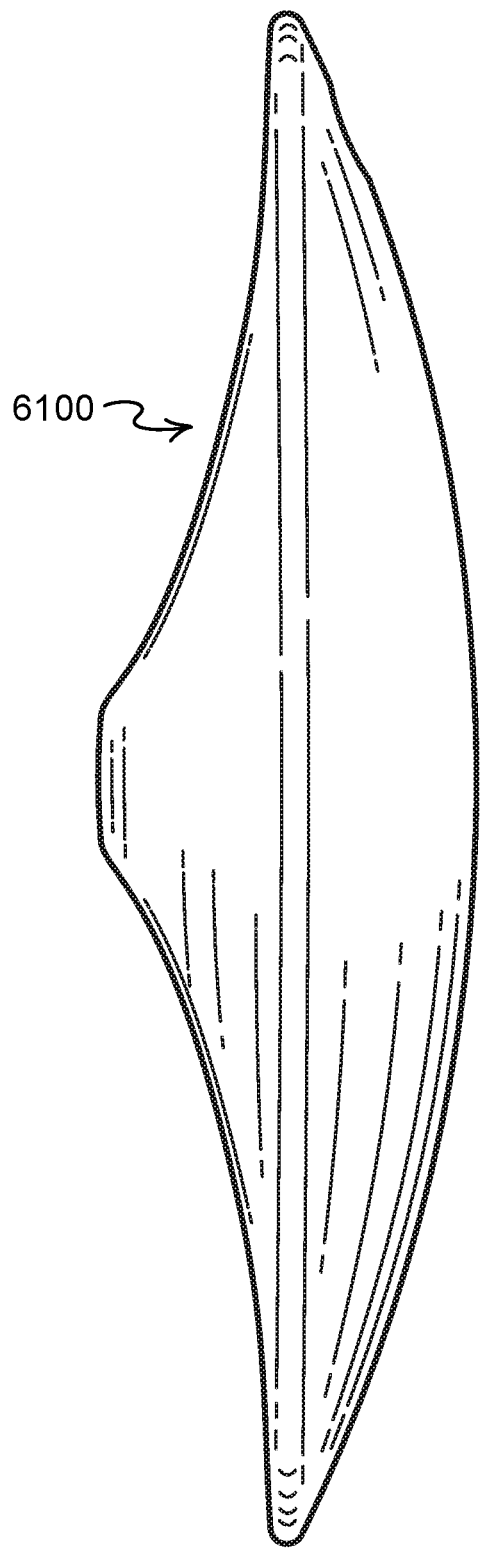
FIG. 34 is a left side view of the eyeglass holder of FIG. 31.
Figure 35:
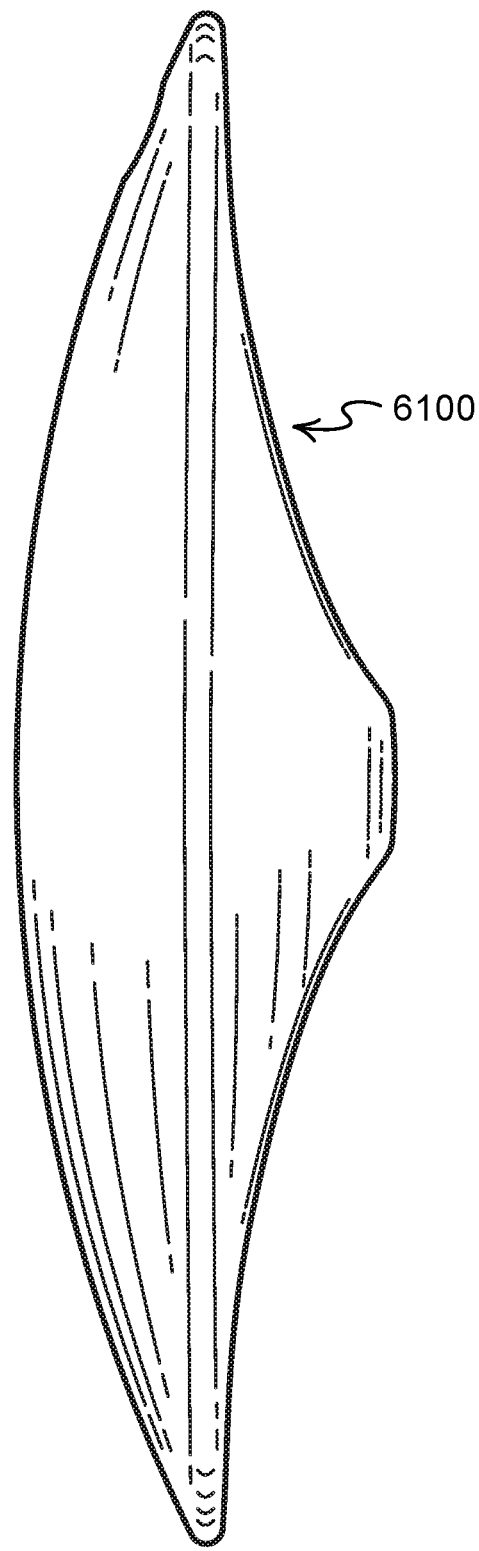
FIG. 35 is a right side view of the eyeglass holder of FIG. 31.
Figure 36:
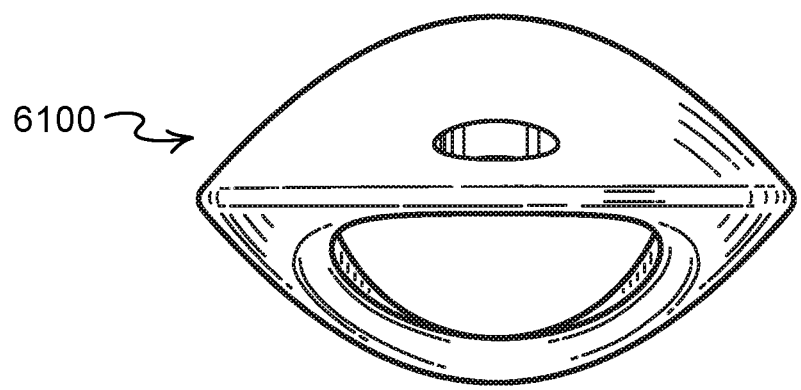
FIG. 36 is a bottom view of the eyeglass holder of FIG. 31.
Figure 37:
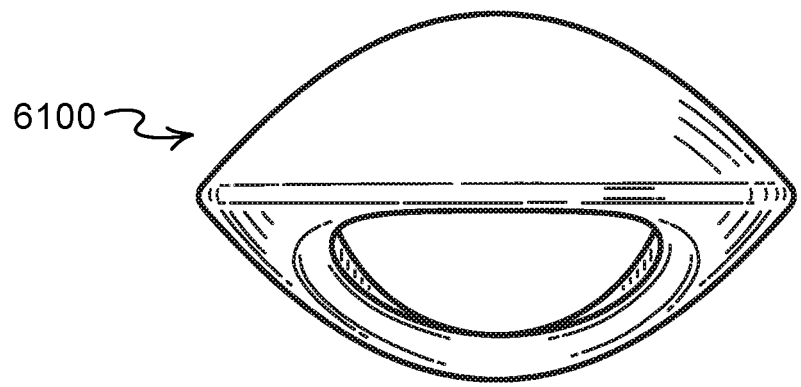
FIG. 37 is a top view of the eyeglass holder of FIG. 31.
Figure 38:
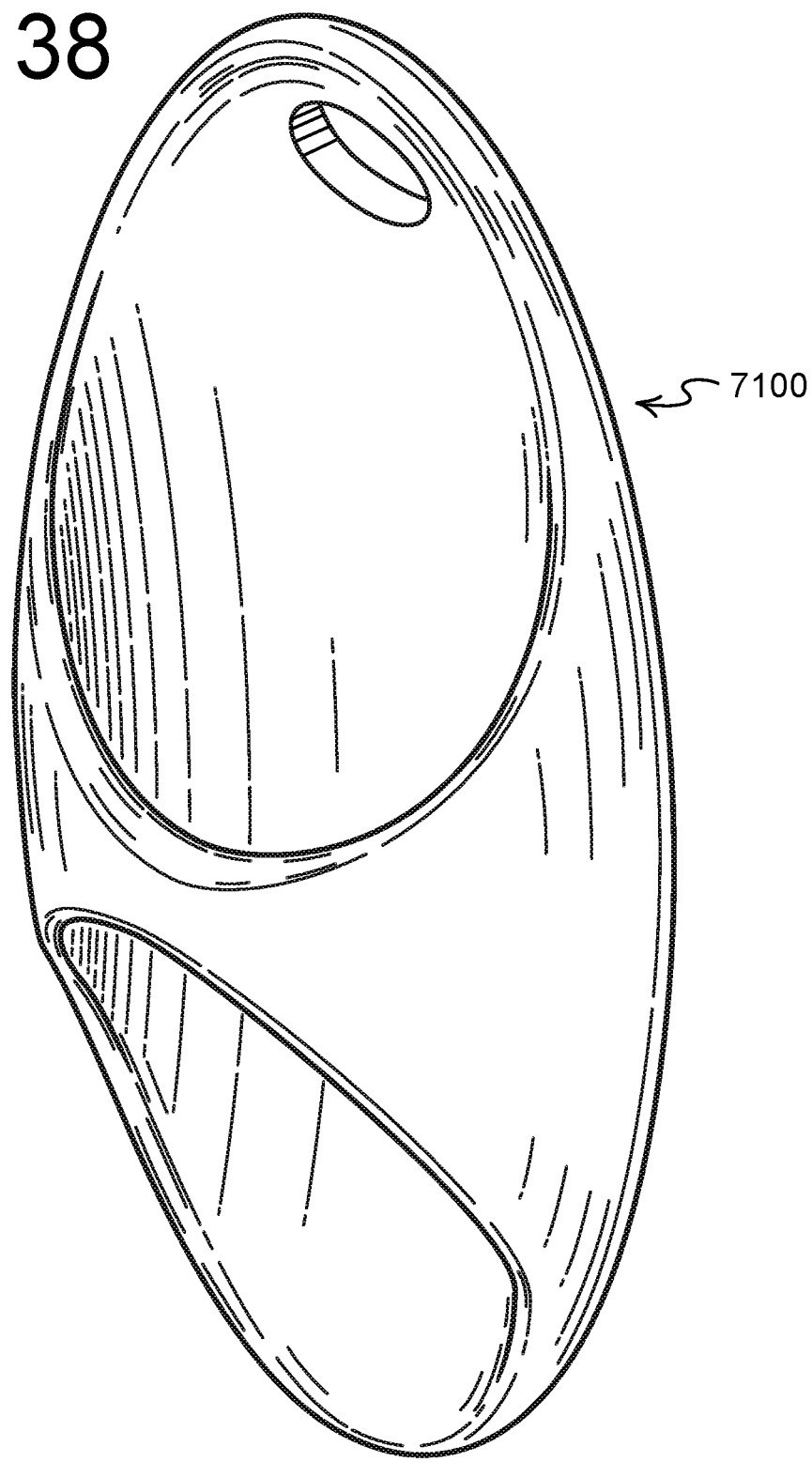
FIG. 38 is a front perspective view of another example embodiment of the eyeglass holder of the present disclosure.
Figure 39:
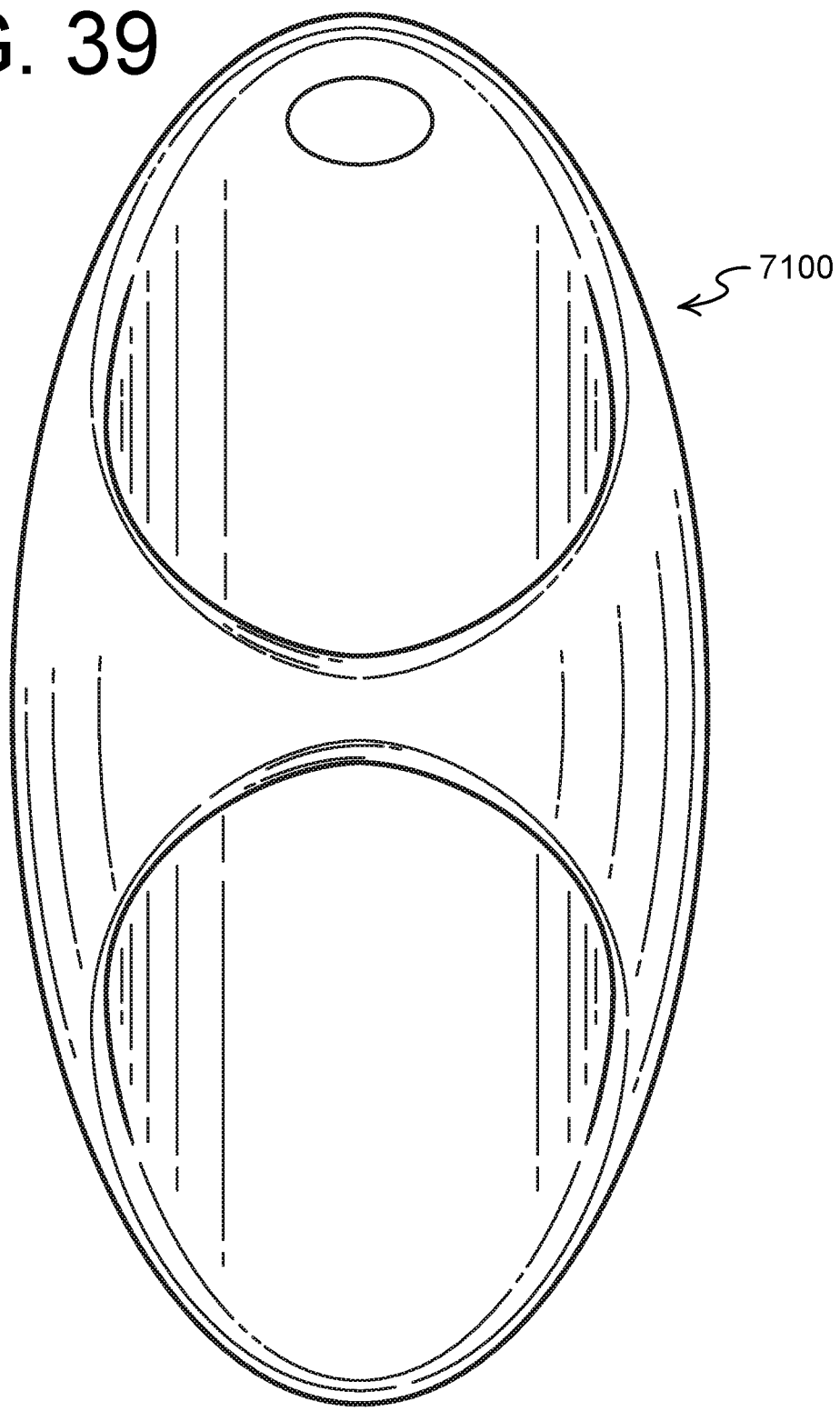
FIG. 39 is a front view of the eyeglass holder of FIG. 38.
Figure 40:
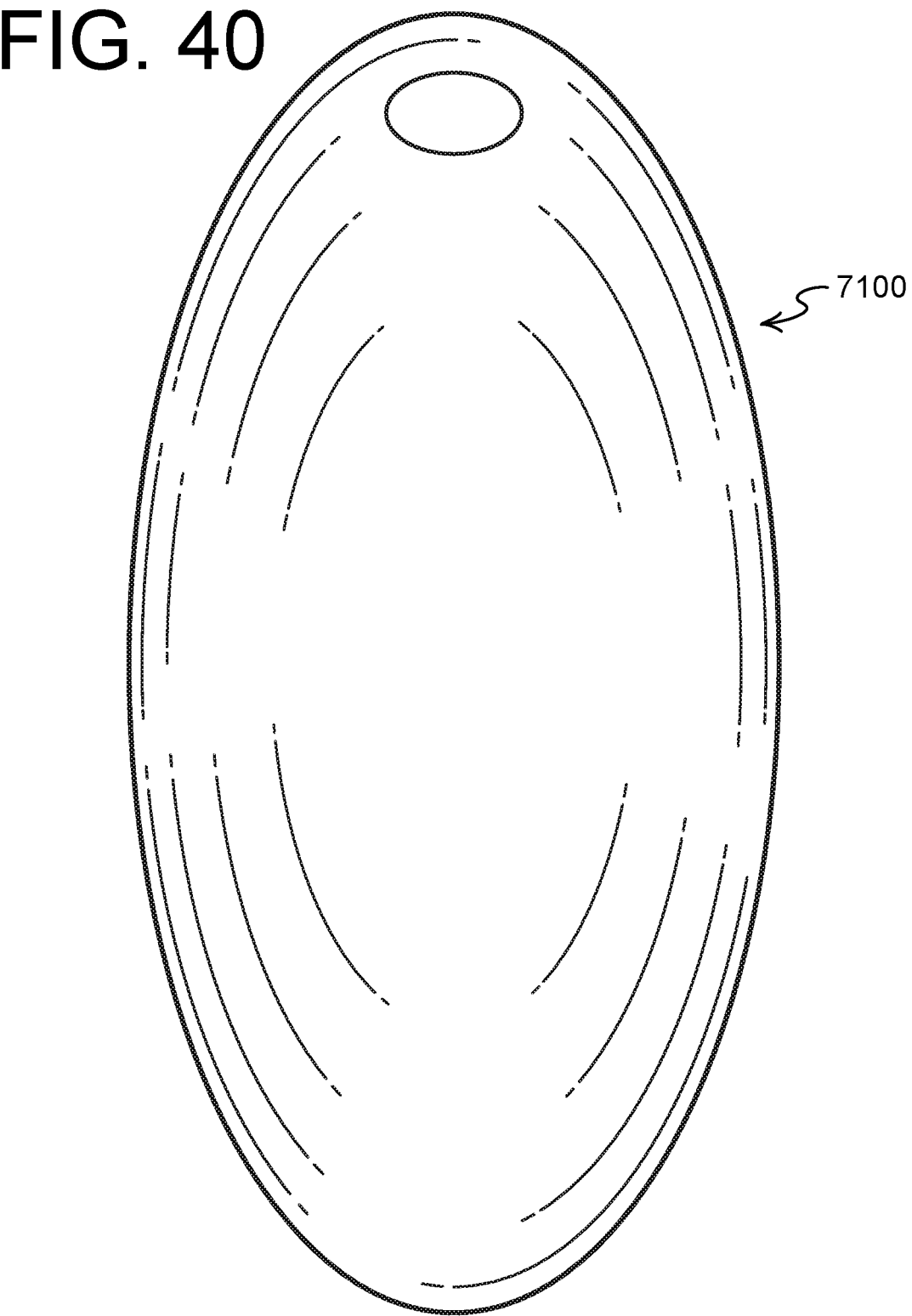
FIG. 40 is a back view of the eyeglass holder of FIG. 38.
Figure 41:
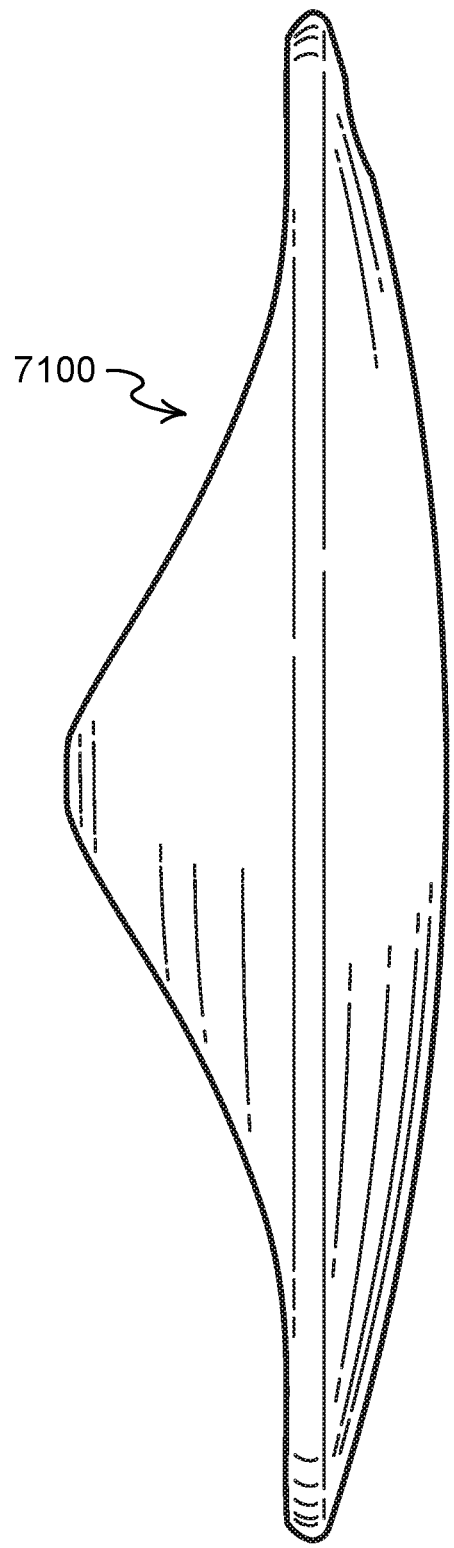
FIG. 41 is a left side view of the eyeglass holder of FIG. 38.
Figure 42:
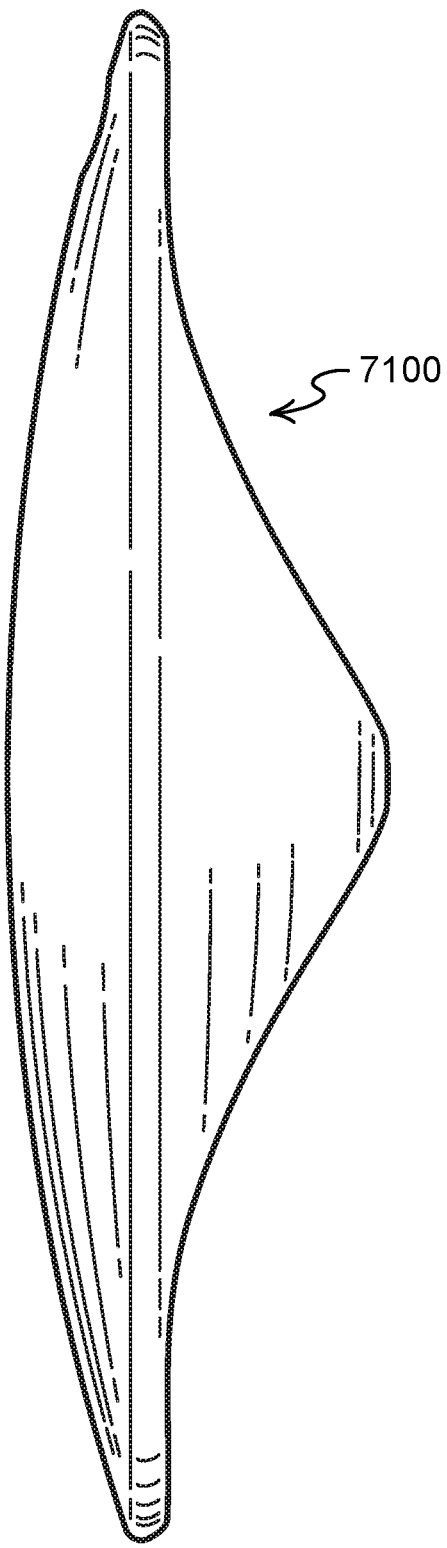
FIG. 42 is a right side view of the eyeglass holder of FIG. 38.
Figure 43:
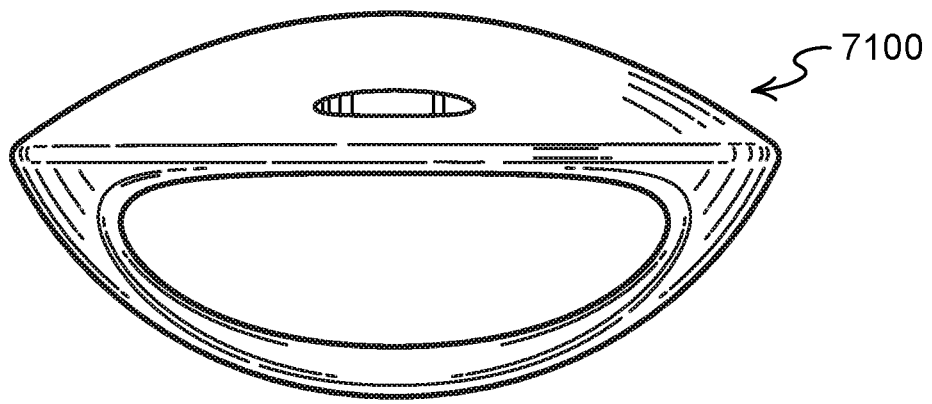
FIG. 43 is a top view of the eyeglass holder of FIG. 38.
Figure 44:
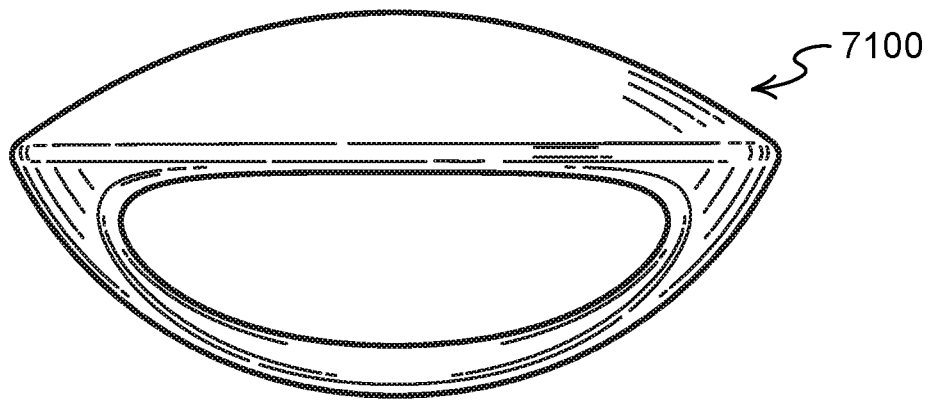
FIG. 44 is a bottom view of the eyeglass holder of FIG. 38.

The present disclosure contemplates that the eyeglass holder can be attached to a wearer fastener in multiple locations such the wearer fastener is configured to pendulously suspend the body of the eyeglass holder from the wearer's neck, the wearer's clothing, or other supporting device at the wearer's disposal. For example, referring now to FIG. 30, the eyeglass holder 5100 is attached to a wearer fastener 5215 at two separate spaced apart locations. More specifically, the eyeglass holder 5100 includes an elongated generally cylindrical tubular body 5102 including: (a) a belly or waist 5110; (b) a first or right arm 5120 connected to and extending from the waist 5110 in a first direction; (c) a second or left arm 5130 connected to and extending from the waist 5110 in a second different direction; (d) a first or right leg 5140 connected to and extending from the waist 5110 in a third different direction; (e) a second or left leg 5150 connected to and extending from the waist 5110 in a fourth different direction; (f) a first or right side 5160 connected to and extending from the first arm 5120 and the first leg 5140; (g) a second or left side 5170 connected to and extending from the second arm 5130 and second leg 5150; and (h) a back 5180 connected to and extending from the first arm 5120, the second arm 5130, the first leg 5140, the second leg 5150, the first side 5160, and the second side 5170. In this illustrated example embodiment, the wearer fastener 5215 is connected to the first or right arm 5120 and the second or left arm 5130 such the wearer fastener is configured to pendulously suspend the body 5102 of the eyeglass holder from the wearer's neck, the wearer's clothing, or other supporting device at the wearer's disposal. It should also be appreciated from this embodiment that the eyeglass holder of the present disclosure can be formed in alternative configurations such as in the illustrated tubular shape, provided that the configuration provides the appropriate contact points as discussed above.

Referring now to FIGS. 31, 32, 33, 34, 35, 36, and 37, the eyeglass holder 6100 having a further alternative configuration is generally illustrated. This illustrated eyeglass holder 6100 has a relatively narrow profile.

Referring now to FIGS. 38, 39, 40, 41, 42, 43, and 44, the eyeglass holder 7100 having a further alternative configuration is generally illustrated. This illustrated eyeglass holder 7100 has a relatively wider profile.

It should thus be appreciated that the present disclosure contemplates a great diversity in the ways in which eyeglass holders of the present disclosure can be embodied, with regard to visual design, communication, support, functions, and accommodation for different styles of eyeglasses.

The presentation of these example embodiments is not intended to limit the visual designs in which this eyeglass holder of the present disclosure can be envisioned; to the contrary, it is to suggest the tremendous visual variety that is possible with this eyeglass holder of the present disclosure. Similarly, the connector does not limit the holder to be worn solely on the wearer's neck or clothing. The holder may be attached to any personal article, such as a purse or backpack; or a vehicle, such as a bicycle, boat, or automobile; or stationary object, such as a desk or a computer.

It should be understood that modifications and variations may be effected without departing from the scope of the novel concepts of the present invention, and it should be understood that this application is to be limited only by the scope of the claims.

The invention is claimed as follows:

1. An eyeglass holder comprising:
an elongated body including:
  (a) a waist having a concave inner surface and a convex outer surface, the waist having a height from an uppermost point of the waist to a lowermost point of the waist;
  (b) a first arm connected to and extending from the waist in a first direction;
  (c) a second arm connected to and extending from the waist in a second different direction;
  (d) a first leg connected to and extending from the waist in a third different direction;
  (e) a second leg connected to and extending from the waist in fourth different direction;
  (f) a foot connected to the first leg and the second leg;
  (g) a head connected to the first arm and the second arm; and
  (h) a back connected to the waist, the first arm, the second arm, the first leg, the second leg, the foot, and the head, the back having an inner surface and an outer surface, the outer surface of the back being convex from the foot to the head, the outer surface of the back being convex from the first arm to the second arm, the outer surface of the back being convex from the first leg to the second leg, the inner surface of the back being concave from the foot to the head, the inner surface of the back being concave from the first arm to the second arm, the inner surface of the back being concave from the first leg to the second leg, wherein the waist, the first arm, the second arm, and the head define an upper opening in an upper portion of the body, the upper opening having a having height from the waist to the head, wherein the waist, the first leg, the second leg, and the foot define a lower opening in a lower portion of the body, the lower opening having a having height from the waist to the foot, wherein the height of the upper opening is greater than the height of the waist, wherein the height of the lower opening is greater than the height of the waist.

2. The eyeglass holder of claim 1, wherein the body includes a first side connected to the back and connected to and extending from the first arm and the first leg, a second side connected to the back and connected to and extending from the second arm and second leg.

3. The eyeglass holder of claim 1, wherein the head defines a fastener opening.

4. The eyeglass holder of claim 1, wherein the body has a greater height than width.

5. The eyeglass holder of claim 1, wherein the body is wider at the waist than at a top portion of the body when viewed from a front of the body.

6. The eyeglass holder of claim 5, wherein the body is wider at the waist than at the top portion of the body when viewed from a side of the body.

7. The eyeglass holder of claim 1, wherein the body is wider at the waist than at the top portion of the body when viewed from a side of the body.

8. The eyeglass holder of claim 1, wherein the body is wider at the waist than at the foot when viewed from a front of the body.

9. The eyeglass holder of claim 8, wherein the body is wider at the waist than at the foot when viewed from a side of the body.

10. The eyeglass holder of claim 1, wherein the body is wider at the waist than at the foot when viewed from a side of the body.

11. The eyeglass holder of claim 1, wherein the body partially defines an elongated inner channel that passes through the body, the body has a greater height than width, the body is wider at the waist than at a top portion of the body when viewed from a front of the body, the body is wider at the waist than at the top portion of the body when viewed from a side of the body, the body is wider at the waist than at the foot when viewed from the front of the body, and the body is wider at the waist than at the foot when viewed from the side of the body.

12. The eyeglass holder of claim 1, wherein the body has a front face and a back face, the body has a central longitudinal axis, the body partially defines an inner channel, the inner channel partially defined by the front face and the back face and extending along the longitudinal axis of the body, the upper opening being in an upper portion of the front face of the body, the upper opening having a first longitudinal axis, and the lower opening being in a lower portion of the front face of the body, the lower opening having a second longitudinal axis, wherein the first longitudinal axis of the upper opening and the second longitudinal axis of the lower opening intersect at an obtuse angle.

13. The eyeglass holder of claim 12, wherein a central portion of the inner channel is wider than an upper portion of the inner channel, wherein the central portion of the inner channel is deeper than the upper portion of the inner channel, wherein a central portion of the inner channel is wider than a lower portion of the inner channel, and wherein the central portion of the inner channel is deeper than the lower portion of the inner channel.

14. The eyeglass holder of claim 12, wherein a central portion of the inner channel is deeper than an upper portion of the inner channel, wherein a central portion of the inner channel is deeper than a lower portion of the inner channel.

15. The eyeglass holder of claim 12, wherein a central portion of the inner channel is wider than an upper portion of the inner channel and the central portion of the inner channel is wider than a lower portion of the inner channel.

16. The eyeglass holder of claim 15, wherein the central portion of the inner channel is deeper than the upper portion of the inner channel and the central portion of the inner channel is deeper than the lower portion of the inner channel.

* * * * *

UNITED STATES PATENT AND TRADEMARK OFFICE
CERTIFICATE OF CORRECTION

PATENT NO. : 10,835,022 B2
APPLICATION NO. : 16/720534
DATED : November 17, 2020
INVENTOR(S) : Patrick J. Byrnes It is certified that error appears in the above-identified patent and that said Letters Patent is hereby corrected as shown below:

In the Claims

Column 14, Line 39    Before "height" delete "having"

Column 14, Line 42    Before "height" delete "having"

Signed and Sealed this
Nineteenth Day of January, 2021

Andrei Iancu
*Director of the United States Patent and Trademark Office*